United States Patent
Okada et al.

(10) Patent No.: US 9,428,692 B2
(45) Date of Patent: Aug. 30, 2016

(54) OXYGEN ABSORBENT COMPOSITION AND OXYGEN ABSORBENT PACKAGE USING THE SAME

(75) Inventors: Satoshi Okada, Hiratsuka (JP); Toshiya Takagi, Hiratsuka (JP); Takashi Kashiba, Hiratsuka (JP); Shinpei Iwamoto, Hiratsuka (JP); Shinichi Ikeda, Hiratsuka (JP); Kenichiro Usuda, Hiratsuka (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 137 days.

(21) Appl. No.: 14/240,609

(22) PCT Filed: Aug. 30, 2012

(86) PCT No.: PCT/JP2012/071963
§ 371 (c)(1),
(2), (4) Date: Apr. 3, 2014

(87) PCT Pub. No.: WO2013/031877
PCT Pub. Date: Mar. 7, 2013

(65) Prior Publication Data
US 2014/0225034 A1   Aug. 14, 2014

(30) Foreign Application Priority Data

Sep. 1, 2011 (JP) .................. 2011-190695
Jul. 26, 2012 (JP) .................. 2012-165374

(51) Int. Cl.

| | | |
|---|---|---|
| C09K 15/04 | (2006.01) | |
| C09K 15/22 | (2006.01) | |
| B65D 81/26 | (2006.01) | |
| C09K 15/06 | (2006.01) | |
| B01J 20/22 | (2006.01) | |
| A23L 3/3436 | (2006.01) | |
| B01D 53/02 | (2006.01) | |
| B01D 53/81 | (2006.01) | |
| B01J 31/22 | (2006.01) | |
| B01J 20/10 | (2006.01) | |
| B01J 20/14 | (2006.01) | |
| B01J 20/20 | (2006.01) | |
| B01J 20/32 | (2006.01) | |
| B01J 20/28 | (2006.01) | |

(52) U.S. Cl.
CPC .............. *C09K 15/04* (2013.01); *A23L 3/3436* (2013.01); *B01D 53/025* (2013.01); *B01D 53/81* (2013.01); *B01J 20/10* (2013.01); *B01J 20/103* (2013.01); *B01J 20/14* (2013.01); *B01J 20/20* (2013.01); *B01J 20/22* (2013.01); *B01J 20/2805* (2013.01); *B01J 20/3204* (2013.01); *B01J 20/3248* (2013.01); *B01J 20/3253* (2013.01); *B01J 31/2239* (2013.01); *B65D 81/266* (2013.01); *C09K 15/06* (2013.01); *C09K 15/22* (2013.01); *B01D 2253/112* (2013.01); *B01D 2253/20* (2013.01); *B01D 2253/25* (2013.01); *B01D 2255/2073* (2013.01); *B01D 2255/20746* (2013.01); *B01D 2257/104* (2013.01); *B01J 2531/72* (2013.01); *B01J 2531/845* (2013.01)

(58) Field of Classification Search
None
See application file for complete search history.

(56) References Cited

U.S. PATENT DOCUMENTS

| | | |
|---|---|---|
| 3,534,002 A | 10/1970 | Gibbons |
| 4,839,323 A | 6/1989 | Goe et al. |
| 5,157,157 A | 10/1992 | Choi et al. |
| 5,189,234 A | 2/1993 | Amelse |
| 5,211,875 A * | 5/1993 | Speer ............... A22C 13/0013 252/188.28 |
| 5,350,622 A | 9/1994 | Speer et al. |
| 6,063,503 A | 5/2000 | Hatakeyama et al. |
| 6,254,803 B1 | 7/2001 | Matthews et al. |
| 7,097,890 B1 | 8/2006 | Ching et al. |
| 2003/0012896 A1* | 1/2003 | Ching ................ B23B 27/06 428/34.2 |

(Continued)

FOREIGN PATENT DOCUMENTS

| | | |
|---|---|---|
| CA | 745651 | 11/1966 |
| CN | 101193976 | 6/2008 |

(Continued)

OTHER PUBLICATIONS

International Search Report in PCT/JP2012/071963 issued Nov. 20, 2012 (English version).

*Primary Examiner* — Tanisha Diggs
(74) *Attorney, Agent, or Firm* — Greenblum & Bernstein, P.L.C.

(57) ABSTRACT

The present invention provides a novel oxygen absorbent composition being capable of realizing an oxygen absorbent not responding to a metal detector, being suppressed in the increase of the odor intensity after the absorption of oxygen and having an excellent oxygen absorption performance over a wide range of humidity conditions from low humidity to high humidity, and provides an oxygen absorbent package using the oxygen absorbent composition. The oxygen absorbent composition of the present invention includes at least one compound having a tetralin ring represented by the following general formula (1) and a transition metal catalyst:

[Formula 1]

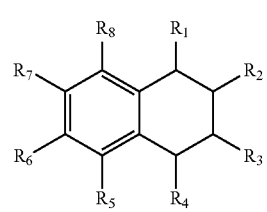

(1)

17 Claims, No Drawings

(56) References Cited

U.S. PATENT DOCUMENTS

| | | | |
|---|---|---|---|
| 2006/0180790 A1 | 8/2006 | Deshpande et al. | |
| 2008/0014395 A1* | 1/2008 | Kitahara | B32B 27/08 428/36.5 |
| 2014/0373485 A1 | 12/2014 | Okada et al. | |
| 2015/0298887 A1 | 10/2015 | Okada et al. | |

FOREIGN PATENT DOCUMENTS

| | | | |
|---|---|---|---|
| EP | 0507207 | | 3/1992 |
| FR | 1.476.463 | | 4/1967 |
| GB | 2000775 | | 7/1978 |
| JP | 51-136845 | | 11/1976 |
| JP | S64-056627 | | 3/1989 |
| JP | 05-115776 | | 5/1993 |
| JP | 07-165776 | | 6/1995 |
| JP | 09-234832 | | 9/1997 |
| JP | 2000-212121 | | 8/2000 |
| JP | 2001-252560 | | 9/2001 |
| JP | 2003-521552 | | 7/2003 |
| JP | 2007-320576 | | 12/2007 |
| JP | 2008050403 | * | 3/2008 |
| JP | 2009-155299 | | 7/2009 |
| SU | 910185 | | 3/1982 |
| WO | 99/48963 | | 9/1999 |
| WO | 99/67225 | | 12/1999 |
| WO | 2013-089268 | | 6/2013 |
| WO | 2013-118882 | | 8/2013 |

\* cited by examiner

OXYGEN ABSORBENT COMPOSITION AND OXYGEN ABSORBENT PACKAGE USING THE SAME

TECHNICAL FIELD

The present invention relates to an oxygen absorbent composition and an oxygen absorbent package using the oxygen absorbent composition, in particular, relates to an oxygen absorbent composition including a compound having a tetralin ring and a transition metal catalyst.

BACKGROUND ART

For the purpose of preventing oxygen oxidation and performing long-term storing of various goods tending to be affected by oxygen and accordingly deteriorated or degraded, typified by, for example, food, beverages, pharmaceuticals and cosmetics, there have been used oxygen absorbents performing removal of oxygen in the packages containing these goods.

As oxygen absorbents, from the viewpoint of the oxygen absorbing capacity, easiness in handling and safety, there have generally been used oxygen absorbents including iron powder as the main reaction agent. However, such iron-based oxygen absorbents respond to metal detectors, and hence it has been difficult to use metal detectors for foreign matter inspection. Packages enclosing iron-based oxygen absorbents have possibility of ignition and hence cannot be heated with microwave ovens. In addition, iron-based oxygen absorbents take advantage of the oxidation reaction of iron powder, and hence have been able to develop the oxygen absorption effect thereof only for the objects to be stored which are high-moisture systems.

By constituting vessels with multilayer materials provided with oxygen absorbing layers composed of oxygen-absorbing resin compositions prepared by mixing iron-based oxygen absorbents with thermoplastic resins, packaging vessels have been developed in such a way that the gas barrier property of the vessels is achieved and the oxygen absorption function is imparted to the vessels themselves (see Patent Literature 1). However, such vessels also have a problem such that such vessels cannot be used for metal detectors, cannot be heated with microwave ovens, and can develop the effect thereof only for the objects to be stored which are high-moisture systems. In addition, such vessels suffer from a problem of insufficient internal visibility due to a problem of opacity.

From the aforementioned circumstances, oxygen absorbents including an organic substance as a main reaction agent are demanded. As the oxygen absorbent including an organic substance as a main reaction agent, an oxygen absorbent including ascorbic acid as the main agent is known (see Patent Literature 2).

On the other hand, an oxygen-absorbing resin composition being composed of a resin and a transition metal catalyst and having an oxygen-capturing property is known. For example, a resin composition is known which is composed of a polyamide, in particular a xylylene group-containing polyamide as an oxidizable organic component and a transition metal catalyst; in addition, a resin composition having an oxygen-capturing function, and an oxygen absorbent, a packaging material, a multilayer laminated film for packaging obtained by molding such a resin composition are shown as examples (see, Patent Literature 3).

As an oxygen-absorbing resin composition requiring no moisture for oxygen absorption, an oxygen-absorbing resin composition composed of a resin having carbon-carbon unsaturated bonds and a transition metal catalyst is also known (see Patent Literature 4).

In addition, as a composition to scavenge oxygen, a composition composed of a polymer including substituted cyclohexene functional group or a low molecular weight substance with the cyclohexene ring bonded thereto and a transition metal is known (see Patent Literature 5).

CITATION LIST

Patent Literature

Patent Literature 1: Japanese Patent Laid-Open No. H09-234832
Patent Literature 2: Japanese Patent Laid-Open No. S51-136845
Patent Literature 3: Japanese Patent Laid-Open No. 2001-252560
Patent Literature 4: Japanese Patent Laid-Open No. H05-115776
Patent Literature 5: National Publication of International Patent Application No. 2003-521552

SUMMARY OF INVENTION

Technical Problem

However, the oxygen absorbent composition of Patent Literature 2 has a problem such that the oxygen absorbent composition is in the first place low in oxygen absorption performance, develops the effect only for an object to be stored which is a high-moisture system, and is comparatively expensive.

The resin composition of Patent Literature 3 develops the oxygen absorption function through the oxidation of the xylylene group-containing polyamide resin by including the transition metal catalyst, and accordingly suffers from a problem such that the oxidation degradation of the resin causes the strength degradation of the resin to degrade the strength of the packaging container itself. In addition, the resin composition has a problem to be solved such that the oxygen absorption performance thereof is still insufficient, and the resin composition develops the effect thereof only for objects to be stored which are high-moisture systems.

The oxygen-absorbing resin composition of Patent Literature 4 also suffers from a problem such that the breakage of the polymer chain caused by the oxidation of the resin produces low molecular weight organic compounds to be odor components so as to increase the odor intensity after the absorption of oxygen.

On the other hand, the composition of Patent Literature 5 suffers from a problem such that the composition requires the use of a specific material including a cyclohexene functional group, and the material comparatively tends to generate odor, and, in addition, is comparatively expensive.

The present invention has been achieved in view of the aforementioned technical problem, and takes as its object the provision of a novel oxygen absorbent composition being capable of realizing an oxygen absorbent not responding to a metal detector, being suppressed in the increase of the odor intensity after the absorption of oxygen and having an excellent oxygen absorption performance, and the provision of an oxygen absorbent package using the oxygen absorbent composition. Another object of the present invention is the provision of an oxygen absorbent composition having an excellent oxygen absorption performance over a wide range of humidity conditions from a low humidity to a high humidity and an oxygen absorbent package using the oxygen absorbent composition.

Solution to Problem

The present inventors made a diligent study on various oxygen absorbent compositions for the purpose of solving such problems as described above, and consequently have perfected the present invention by discovering that the foregoing problems can be solved by using a compound having a predetermined tetralin ring and by using a predetermined transition metal catalyst.

Specifically, the present invention provides the following <1> to <17>.

<1> An oxygen absorbent composition comprising at least one compound having a tetralin ring represented by the following general formula (1) and a transition metal catalyst:

[Formula 1]

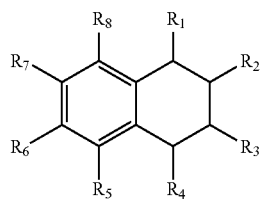

(1)

(wherein, in formula (1), $R_1$ to $R_8$ each independently represent a hydrogen atom or a monovalent substituent; the monovalent substituent is the one selected from the group consisting of a halogen atom, an alkyl group, an alkenyl group, an alkynyl group, an aryl group, a heterocyclic ring group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic ring thio group and an imide group; these groups may further have a substituent(s) and two substituents of $R_1$ to $R_8$ may be bonded to each other to form a ring.)

<2> The oxygen absorbent composition according to <1>, wherein the compound having the tetralin ring represented by the foregoing general formula (1) has two or more carbonyl groups.

<3> The oxygen absorbent composition according to <2>, wherein in the foregoing general formula (1), two or more of $R_1$ to $R_8$ are each a monovalent substituent represented by the following general formula (2):

—C(=O)X (2)

(wherein, in formula (2), X is a hydrogen atom, a hydroxy group, an alkyl group, an alkoxy group, a monoalkylamino group or a dialkylamino group.

<4> The oxygen absorbent composition according to <3>, wherein in the foregoing general formula (1), $R_1$ to $R_8$ satisfy any of the following requirements (A) to (C);

(A) one or more of $R_1$ to $R_4$ are the monovalent substituents represented by the foregoing general formula (2), and one or more of $R_5$ to $R_8$ are the monovalent substituents represented by the foregoing general formula (2);

(B) two or more of $R_1$ to $R_4$ are the monovalent substituents represented by the foregoing general formula (2); and (C) two or more of $R_5$ to $R_8$ are the monovalent substituents represented by the foregoing general formula (2).

<5> The oxygen absorbent composition according to any one of <1> to <4>, wherein the compound having the tetralin ring represented by the foregoing formula (1) has a molecular weight of 190 to 1500.

<6> The oxygen absorbent composition according to any one of <1> to <5>, further comprising a carrier substance.

<7> The oxygen absorbent composition according to <6>, wherein the carrier substance is at least one or more selected from the group consisting of synthetic calcium silicate, diatom earth, silica and activated carbon.

<8> The oxygen absorbent composition according to <6> or <7>, wherein the carrier substance is contained in an amount of 10 to 1000 parts by mass based on 100 parts by mass of the compound having the tetralin ring represented by the foregoing formula (1).

<9> The oxygen absorbent composition according to any one of <1> to <8>, wherein the transition metal catalyst comprises at least one or more transition metals selected from the group consisting of manganese, iron, cobalt, nickel and copper.

<10> The oxygen absorbent composition according to any one of <1> to <9>, wherein the transition metal catalyst is contained in an amount of 0.001 to 10 parts by mass in terms of the transition metal amount, based on 100 parts by mass of the compound having the tetralin ring represented by the foregoing formula (1).

<11> The oxygen absorbent composition according to any one of <1> to <5>, further comprising a thermoplastic resin.

<12> The oxygen absorbent composition according to <11>, further comprising a carrier substance.

<13> The oxygen absorbent composition according to <12>, wherein the carrier substance is at least one or more selected from the group consisting of synthetic calcium silicate, diatom earth, silica and activated carbon.

<14> The oxygen absorbent composition according to <12> or <13>, wherein the carrier substance is contained in an amount of 10 to 1000 parts by mass based on 100 parts by mass of the compound having the tetralin ring represented by the foregoing formula (1).

<15> The oxygen absorbent composition according to any one of <11> to <14>, wherein the transition metal catalyst comprises at least one or more transition metals selected from the group consisting of manganese, iron, cobalt, nickel and copper.

<16> The oxygen absorbent composition according to any one of <11> to <15>, wherein the transition metal catalyst is contained in an amount of 0.001 to 10 parts by mass in terms of the transition metal amount, based on 100 parts by mass of the compound having the tetralin ring represented by the foregoing formula (1).

<17> An oxygen absorbent package formed by packaging the oxygen absorbent composition according to any one of <1> to <16> with an air permeable packaging material.

Advantageous Effects of Invention

According to the present invention, an oxygen absorbent composition having an excellent oxygen absorption performance can be realized, and for example, an oxygen absorbent composition having an excellent oxygen absorption performance over a wide range of humidity conditions from a low humidity to a high humidity can be realized. The oxygen absorbent composition and the like can absorb oxygen irrespective as to whether or not the object to be stored has moisture, and in addition, suppresses the increase of the odor intensity after the absorption of oxygen, and hence can be used, without discriminating the application objects, over a wide range of applications to, for example, food, prepared food, beverages, pharmaceuticals and health food. By using the non-iron-based oxygen absorbent composition, an oxygen absorbent not responding to a metal detector can be realized.

DESCRIPTION OF EMBODIMENT

Hereinafter, the embodiment of the present invention is described. The following embodiment is presented as exemplification for describing the present invention, and the present invention is not limited only to the embodiment.

(Oxygen Absorbent Composition)

The oxygen absorbent composition of the present embodiment includes at least a compound having the tetralin ring represented by the following general formula (1) and a transition metal catalyst:

[Formula 2]

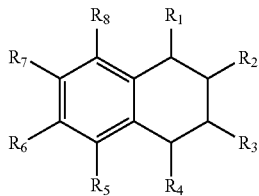

(1)

(wherein, in formula (1), $R_1$ to $R_8$ each independently represent a hydrogen atom or a monovalent substituent; the monovalent substituent is the one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxygroup, an acyl group, an amino group, a mercapto group, an alkylthio group, an arylthio group, a heterocyclic thio group and an imide group; these groups may further have a substituent(s) and two substituents of $R_1$ to $R_8$ may be bonded to each other to form a ring.)

In the foregoing formula (1), examples of the monovalent substituents represented by $R_1$ to $R_8$ include, without being particularly limited to: halogen atoms (such as a chlorine atom, a bromine atom and an iodine atom), alkyl groups (linear, branched or cyclic alkyl groups having preferably 1 to 15 carbon atoms, more preferably 1 to 6 carbon atoms, such as a methyl group, an ethyl group, an n-propyl group, an isopropyl group, a t-butyl group, an n-octyl group, a 2-ethylhexyl group, a cyclopropyl group and a cyclopentyl group), alkenyl groups (linear, branched or cyclic alkenyl groups preferably having 2 to 10 carbon atoms, more preferably 2 to 6 carbon atoms, such as a vinyl group and an allyl group), alkynyl groups (alkynyl groups having preferably 2 to 10 carbon atoms, more preferably 2 to 6 carbon atoms, such as an ethynyl group and a propargyl group), aryl groups (aryl groups having preferably 6 to 16 carbon atoms, more preferably 6 to 10 carbon atoms, such as a phenyl group and a naphthyl group), heterocyclic groups (monovalent groups obtained by eliminating one hydrogen atom from 5-membered ring or 6-membered ring aromatic or non-aromatic heterocyclic compounds having preferably 1 to 12 carbon atoms, more preferably 2 to 6 carbon atoms, such as a 1-pyrazolyl group, a 1-imidazolyl group and a 2-furyl group), a cyano group, a hydroxy group, a carboxyl group, ester groups, amide groups, a nitro group, alkoxy groups (linear, branched or cyclic alkoxy groups having preferably 1 to 10 carbon atoms, more preferably 1 to 6 carbon atoms, such as a methoxy group and an ethoxy group), aryloxy groups (aryloxy groups having preferably carbon 6 to 12 carbon atoms, more preferably 6 to 8 carbon atoms, such as a phenoxy group), acyl groups (inclusive of a formyl group, alkyl carbonyl groups having preferably 2 to 10 carbon atoms, more preferably having 2 to 6 carbon atoms, and aryl carbonyl groups having preferably 7 to 12 carbon atoms, more preferably 7 to 9 carbon atoms, such as an acetyl group, a pivaloyl group and a benzoyl group), amino groups (alkyl amino groups having preferably 1 to 10 carbon atoms, more preferably 1 to 6 carbon atoms, anilino groups having preferably 6 to 12 carbon atoms, more preferably 6 to 8 carbon atoms, and heterocyclic amino groups having preferably 1 to 12 carbon atoms, more preferably 2 to 6 carbon atoms, such as an amino group, a methyl amino group and an anilino group), mercapto groups, alkylthio groups (alkylthio groups having preferably 1 to 10 carbon atoms, more preferably 1 to 6 carbon atoms, such as a methylthio group and an ethylthio group), arylthio groups (arylthio groups having preferably 6 to 12 carbon atoms, more preferably 6 to 8 carbon atoms, such as a phenylthio group), heterocyclic thio groups (heterocyclic thio groups having preferably 2 to 10 carbon atoms, more preferably 1 to 6 carbon atoms, such as a 2-benzothiazolylthio group), and imide groups (imide groups having preferably 2 to 10 carbon atoms, more preferably 4 to 8 carbon atoms, such as an N-succinimide group and an N-phthalimide group).

When the monovalent substituents $R_1$ to $R_8$ have a hydrogen atom(s), the hydrogen atom(s) may further be substituted with a substituent T (here, the substituent T is defined in the same manner as in the foregoing description of the monovalent substituents $R_1$ to $R_8$). Specific examples of such groups include, without being particularly limited to: alkyl groups substituted with a hydroxy group (such as a hydroxyethyl group), alkyl groups substituted with an alkoxy group (such as a methoxy ethyl group), alkyl groups substituted with an aryl group (such as a benzyl group), alkyl groups substituted with a primary or secondary amino group (such as an amino ethyl group), aryl groups substituted with an alkyl group (such as a p-tolyl group), and aryloxy groups substituted with an alkyl group (such as a 2-methyl phenoxy group). When the monovalent substituents $R_1$ to $R_8$ each have a monovalent substituent T, the foregoing number of carbon atoms does not include the number of carbon atoms of the substituent T. For example, a benzyl group is regarded as an alkyl group having one carbon atom, substituted with a phenyl group, but not as an alkyl group having 7 carbon atoms. When the monovalent substituents $R_1$ to $R_8$ each have the substituent(s) T, the number of the substituents T may be two or more.

Two substituents of $R_1$ to $R_8$ may be bonded to each other to form a ring. More specifically, $R_1$ and $R_2$ or $R_8$, $R_1$ and $R_4$, or $R_n$(n=2 to 7) and $R_{(n-1)}$ or $R_{(n+1)}$ may be respectively bonded to each other to form a condensed ring. Specific examples of such a compound include a compound in which $R_1$ and $R_8$ are condensed to form a 5 to 8 membered ring, and a compound in which $R_2$ and $R_3$ are condensed to form a 5 to 8 membered ring. The ring as referred to herein may be any heretofore known ring structure, without being particularly limited, and is preferably an aromatic ring or an alicyclic ring, or a heterocycle, having 4 to 7 carbon atoms (more preferably, a cyclohexane ring, a cycloheptane ring, acid anhydride rings (such as a succinic anhydride ring, a glutaric anhydride ring and an adipic anhydride ring), a benzene ring and a bicyclo ring).

From the viewpoint of the suppression of the loss due to volatilization during use, and at the same time, the increase of the oxygen absorption amount per unit mass of the compound, the compound having the tetralin ring represented by the foregoing general formula (1) is preferably: a compound in which at least one of $R_1$ to $R_8$ is a group selected from the group (hereinafter, also simply referred to as "the substituent group S") consisting of a substituted or unsubstituted alkyl group, a substituted or unsubstituted aryl group, a hydroxy group, a carboxyl group, a substituted or unsubstituted ester group, an alkoxy group, an acyl group, a substituted or unsubstituted amide group and a substituted or unsubstituted imide group; a compound in which $R_1$ and $R_8$ or $R_4$ and $R_5$ are condensed to form a 5 to 6 membered ring; a compound in which $R_2$ and $R_3$ or $R_6$ and $R_7$ are condensed to form a 5 to 6 membered ring; or a compound in which $R_1$ and $R_2$ or $R_7$ and $R_8$ are condensed to form a 5 to 6 membered ring. In the substituent group S, the following are more preferable: a substituted or unsubstituted alkyl group, a substituted or unsubstituted aryl group, a hydroxy group, a carboxyl group, an alkoxy group, a substituted or unsubstituted ester group and a substituted or unsubstituted amide group.

As a first preferable aspect of the compound having the tetralin ring represented by the general formula (1), a compound having the structure shown below is quoted:

[Formula 3]

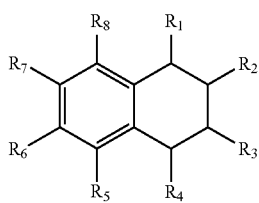

(1)

(wherein, in formula (1), $R_1$ to $R_8$ each independently represent a hydrogen atom or a monovalent substituent, and the monovalent substituents $R_1$ to $R_8$ are the same as described above, but two or more of $R_1$ to $R_8$ are not bonded to each other to form a ring(s).)

In the first aspect, at least two or more of $R_1$ to $R_8$ are each a group selected from the foregoing substituent group S, and $R_1$ to $R_8$ other than such groups are each preferably a hydrogen atom; more preferably, two of $R_1$ to $R_8$ are each a group selected form the substituent group S, and six of $R_1$ to $R_8$ are each a hydrogen atom.

In the first aspect, various isomers are included; for example, when two substituents are introduced into the tetralin represented by the following general formula (1-1), the tetralin derivatives represented by the following general formulas (1-2) to (1-15) can be formed as structural isomers; however, the introduction positions (substitution positions) are not particularly limited:

[Formula 4]

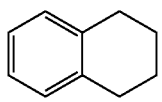

(1-1)

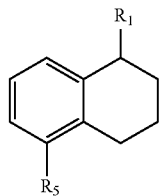

(1-2)

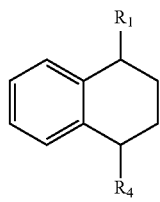

(1-3)

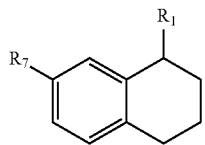

(1-4)

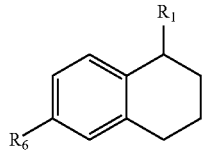

(1-5)

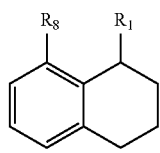

(1-6)

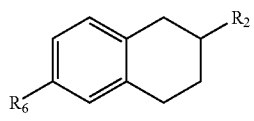

(1-7)

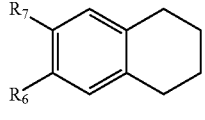

(1-8)

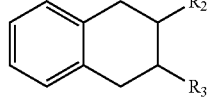

(1-9)

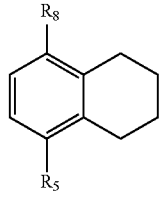

(1-10)

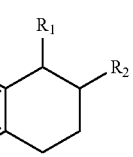

(1-11)

-continued

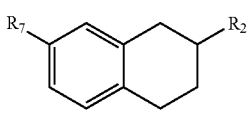
(1-12)

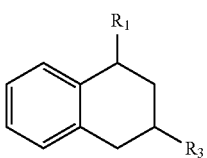
(1-13)

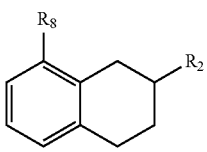
(1-14)

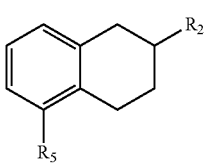
(1-15)

Hereinafter, examples included in the first aspect are listed; however, the first aspect is not particularly limited to these examples:

[Formula 5]

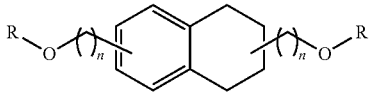
(1-16)

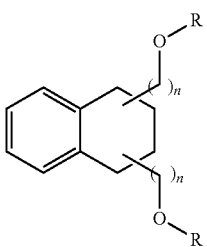
(1-17)

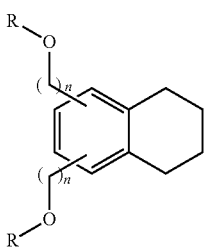
(1-18)

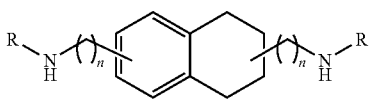
(1-19)

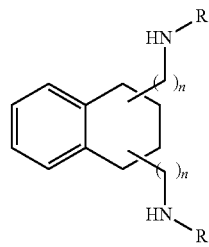
(1-20)

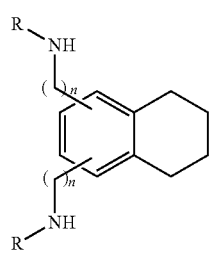
(1-21)

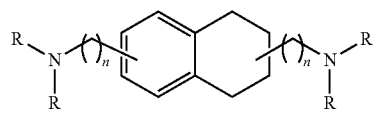
(1-22)

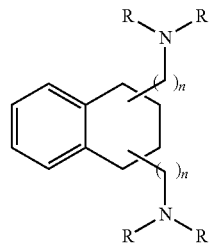
(1-23)

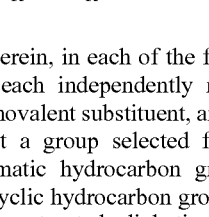
(1-24)

(wherein, in each of the formulas, n is an integer of 0 to 3, Rs each independently represent a hydrogen atom or a monovalent substituent, and the monovalent substituent is at least a group selected from the group consisting of an aromatic hydrocarbon group, a saturated or unsaturated alicyclic hydrocarbon group, a linear or branched, saturated or unsaturated aliphatic hydrocarbon group, and an acyl group.)

Here, examples of the aromatic hydrocarbon group include, without being particularly limited to: a phenyl group, a tolyl group, a xylyl group, a naphthyl group, an anthracenyl group, a phenanthryl group, a biphenyl group and a fluorenyl group. Examples of the alicyclic hydrocarbon group include, without being particularly limited to: cycloalkyl groups such as a cyclohexyl group and a cyclopentyl group, and cycloalkenyl groups. Examples of the aliphatic hydrocarbon group include, without being particularly limited to: linear and branched alkyl groups such as a methyl group, an ethyl group, an n-propyl group, an isopropyl group, an n-butyl group, an isobutyl group, a sec-butyl group, a tert-butyl group, an n-hexyl group, an n-octyl group, an n-decyl group, a lauryl group, a stearyl group and a palmityl group; and alkenyl groups such as an ethenyl group, a propenyl group, a butenyl group, an octenyl group, a nonadecenyl group and a pentacosenyl group. Examples of the acyl group include, without being particularly limited to: an acetyl group, a pivaloyl group and a benzoyl group. These groups may each further have a substituent(s), and specific examples of such a substituent include a halogen atom, an alkoxy group, a hydroxy group, a carboxyl group, a carboalkoxy group, an amino group, an acyl group, thio groups (such as an alkylthio group, a phenylthio group, a tolylthio group and a pyridylthio group), an amino group (such as an unsubstituted amino group, a methylamino group, a dimethylamino group and a phenylamino group), a cyano group and a nitro group.

As a second preferable aspect of the compound having the tetralin ring represented by the general formula (1), compounds having the structures represented by the following general formulas (2-1) to (2-5) are quoted:

[Formula 6]

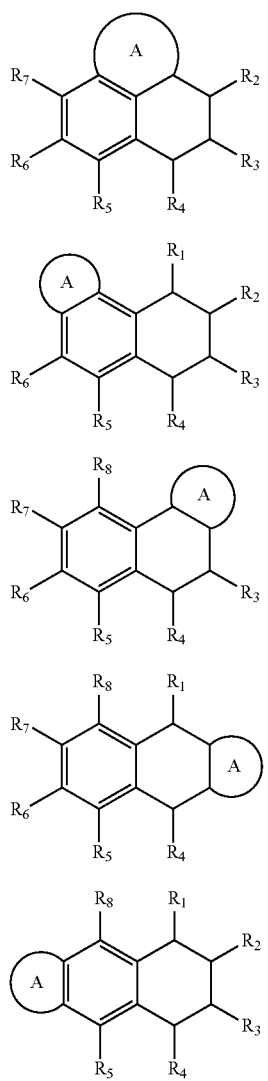

(2-1)

(2-2)

(2-3)

(2-4)

(2-5)

(wherein, in each of the formulas, $R_1$ to $R_8$ each independently represent a hydrogen atom or a monovalent substituent, and the monovalent substituents $R_1$ to $R_8$ are the same as described above for the general formula (1), and the arcs A are each a substituted or unsubstituted aromatic, heterocyclic or acid anhydride ring having 4 to 7 carbon atoms.)

In the second aspect, the arcs A are each preferably an aromatic ring, an aliphatic ring or a heterocycle having 4 to 7 carbon atoms. Specific examples of the arcs A include a benzene ring, a cyclopentane ring, a cyclohexane ring, a cycloheptane ring, an acid anhydride ring (a succinic anhydride ring, a glutaric anhydride ring and an adipic anhydride ring).

In addition, as a third preferable aspect of the compound having the tetralin ring represented by the general formula (1), a compound having two or more carbonyl groups and at least one or more hydrogen atoms in the benzylic position is quoted.

As an example of the third aspect having two or more carbonyl groups, a compound having the structure shown below is quoted:

[Formula 7]

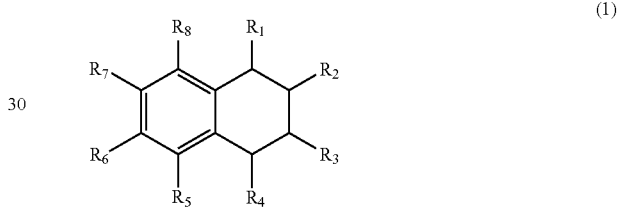

(1)

(wherein, in formula (1), $R_1$ to $R_8$ each independently represent a hydrogen atom or a monovalent substituent, the monovalent substituents $R_1$ to $R_8$ are the same as described above, but two or more of $R_1$ to $R_8$ are not bonded to each other to form a ring(s).)

In the third aspect, two or more of $R_1$ to $R_8$ each preferably represent a monovalent substituent represented by the following general formula (2):

—C(=O)X (2)

(wherein, in formula (2), X is a hydrogen atom, a hydroxy group, an alkyl group, an alkoxy group, a monoalkylamino group or a dialkylamino group.)

In addition, in the third aspect, the $R_1$ to $R_8$ preferably each satisfy any of the following requirements (A) to (C):

(A) one or more of $R_1$ to $R_4$ are the monovalent substituents represented by the foregoing general formula (2), and one or more of $R_5$ to $R_8$ are the monovalent substituents represented by the foregoing general formula (2);

(B) two or more of $R_1$ to $R_4$ are the monovalent substituents represented by the foregoing general formula (2); and (C) two or more of $R_5$ to $R_8$ are the monovalent substituents represented by the foregoing general formula (2).

In the monovalent substituent represented by the general formula (2), X is preferably an alkoxy group or a monoalkylamino group respectively represented by a —O—Z group or a —NH—Z group, and the —Z thereof is more preferably an aromatic hydrocarbon group having 1 to 10 carbon atoms, a saturated or unsaturated alicyclic hydrocarbon group, or a linear or branched, saturated or unsaturated aliphatic hydrocarbon group. Specific examples of these duplicate the foregoing description of the substituent R, and hence the description of such specific examples is omitted herein.

Hereinafter, examples of the third aspect satisfying the requirements (A) to (C) are listed; however, the third aspect is not particularly limited to these examples:

[Formula 8]

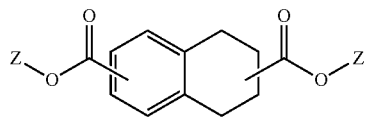
(3-1)

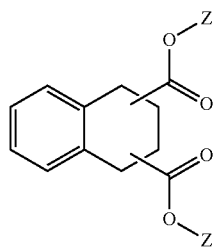
(3-2)

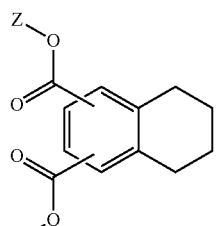
(3-3)

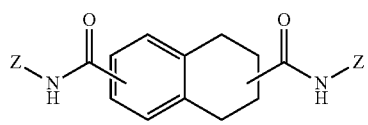
(3-4)

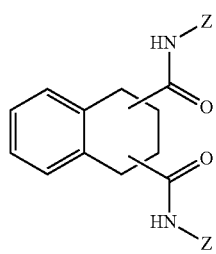
(3-5)

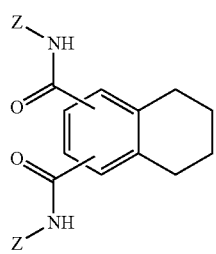
(3-6)

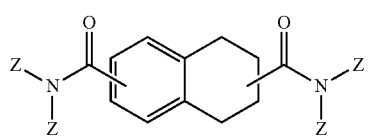
(3-7)

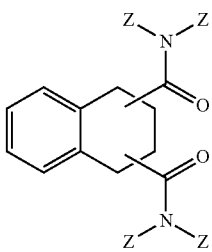
(3-8)

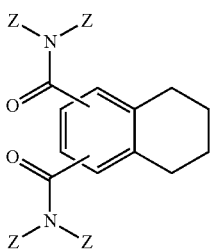
(3-9)

(wherein, in each of the formulas, Z is the same as described in the general formula (2).)

In the third aspect, the compounds represented by the following general formulas (3-10) to (3-20) are more preferable:

[Formula 9]

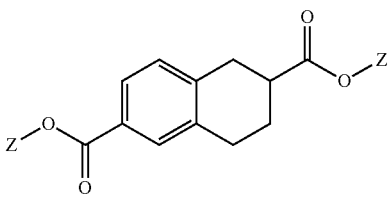
(3-10)

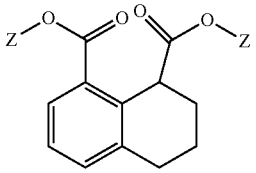
(3-11)

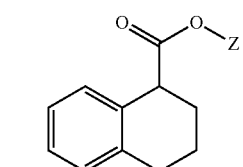
(3-12)

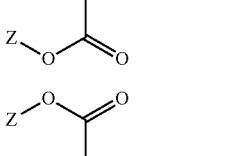
(3-13)

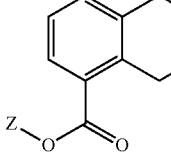

(3-14)
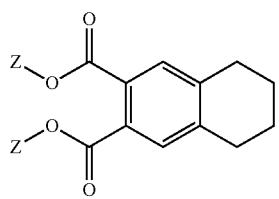
(3-15)
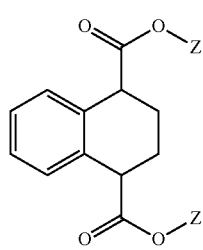
(3-16)
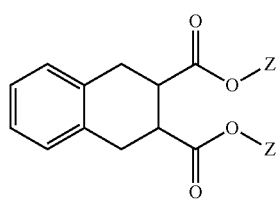
(3-17)
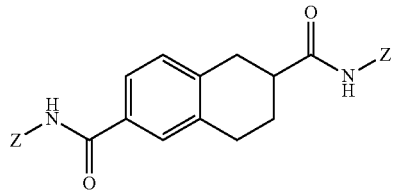
(3-18)
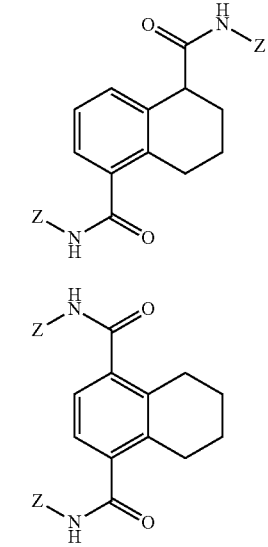
(3-19)
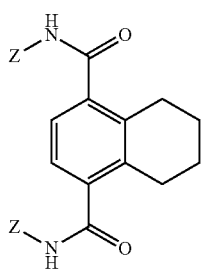
(3-20)
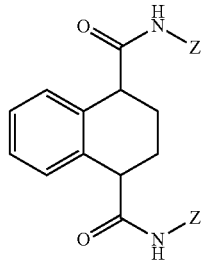
Hereinafter, specific examples of the compound having the tetralin ring represented by the general formula (1) are shown, but the compound having the tetralin ring represented by the general formula (1) is not limited to these examples:
[Formula 10]
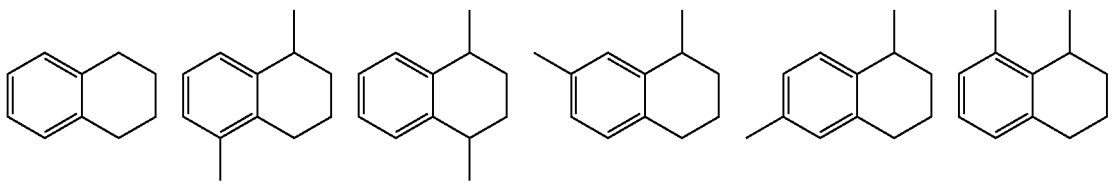
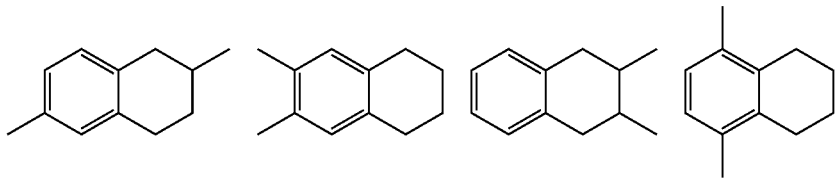

[Formula 11]
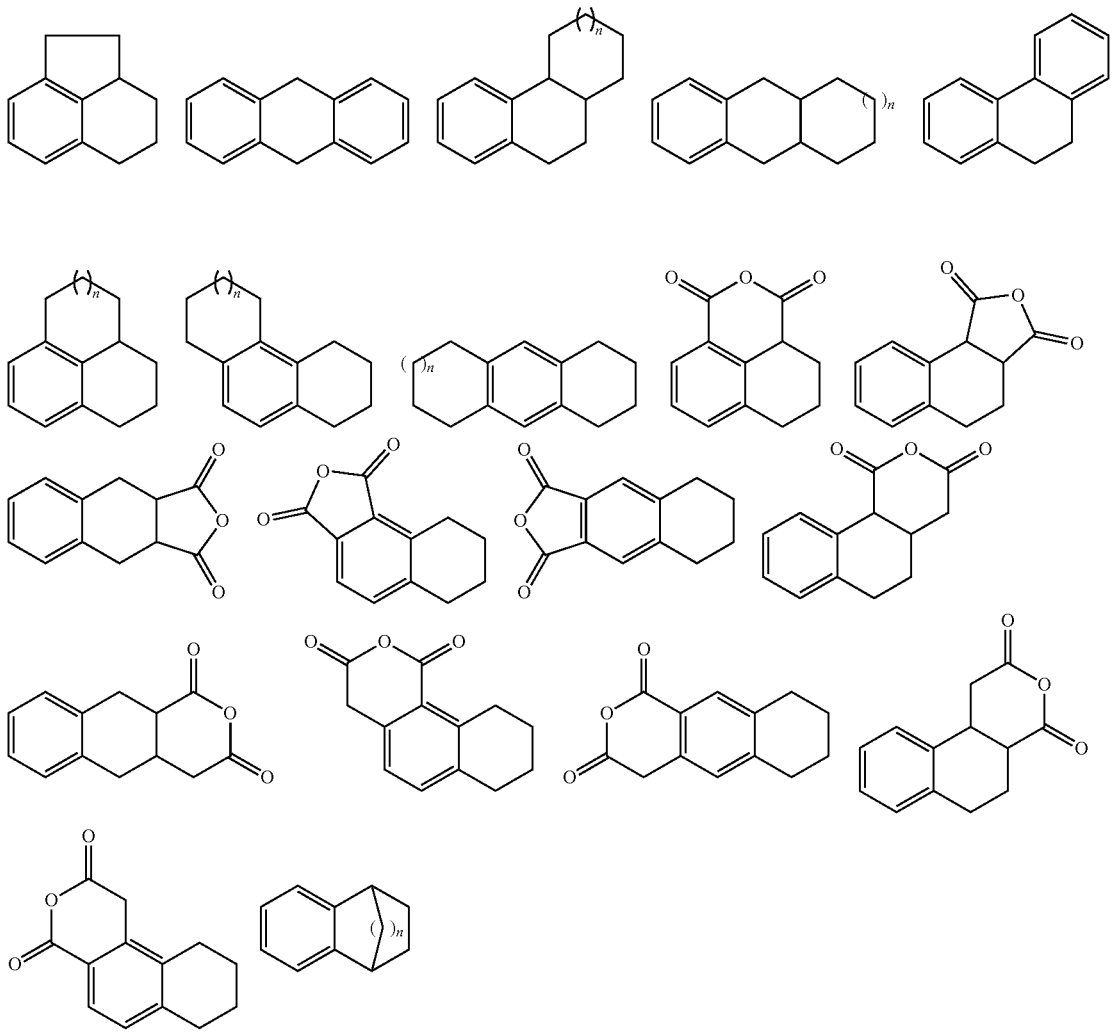
(wherein, in each of the formulas, n is an integer of 0 to 3.)
[Formula 12]
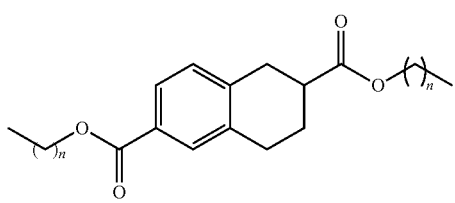
(wherein, in the formula, n represents an integer of 0 to 7.)
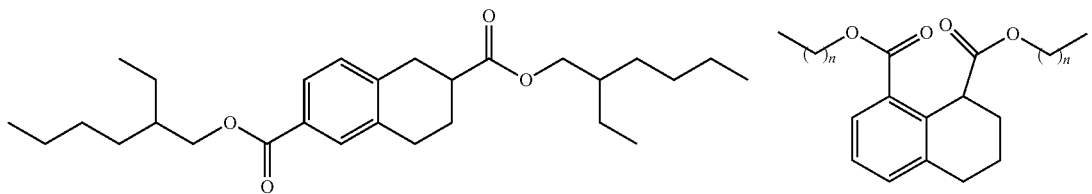
(wherein, in the formula, n represents an integer of 0 to 7.)

-continued

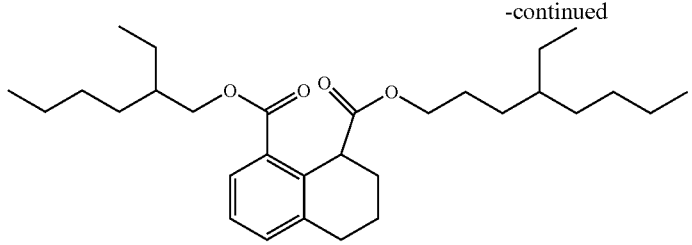

[Formula 13]

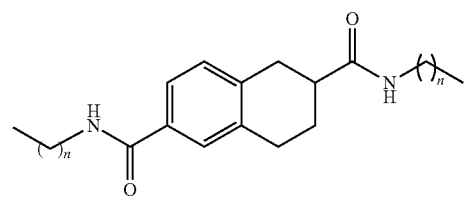

(wherein, in the formula, n represents an integer of 0 to 7.)

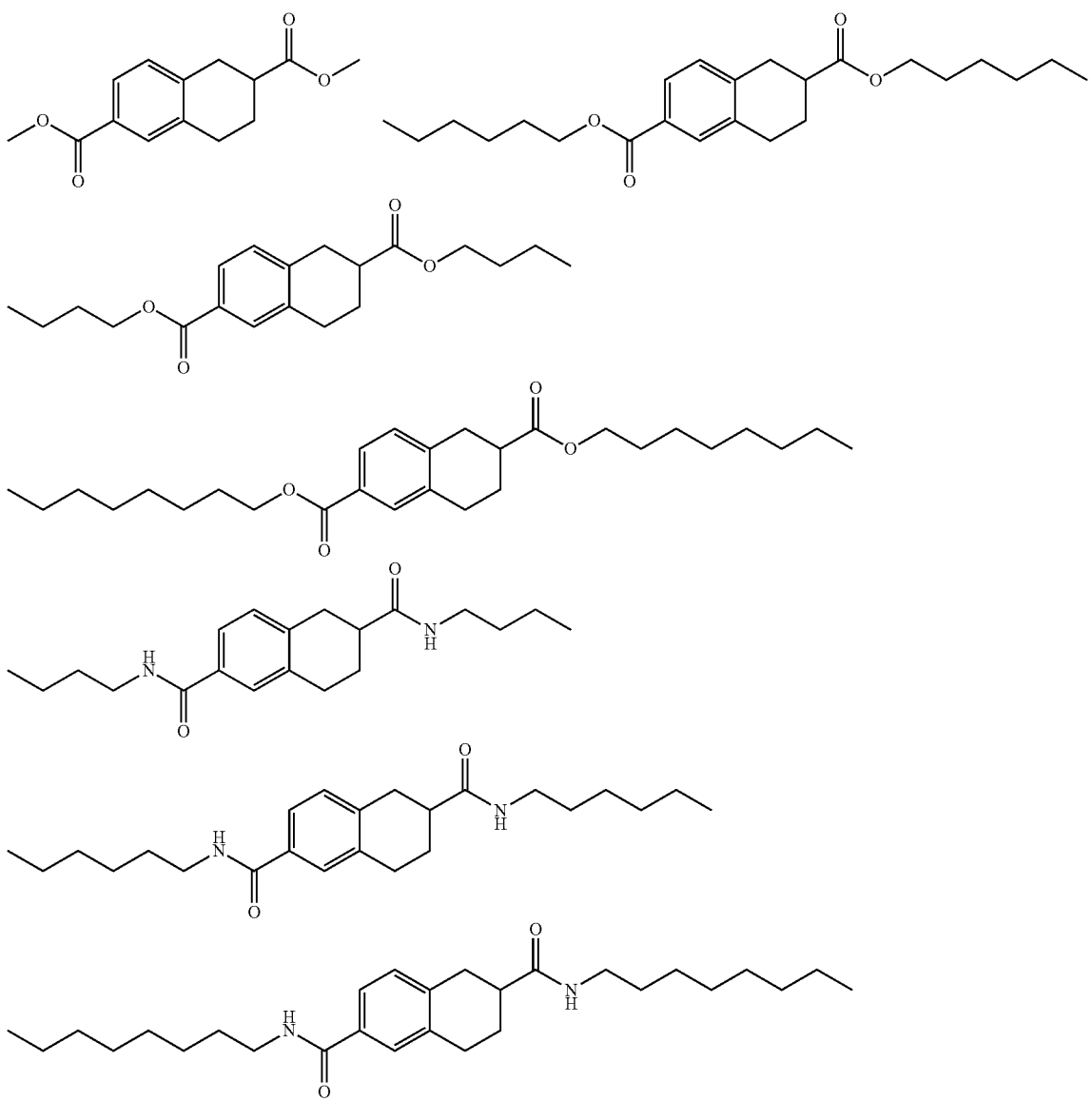

The foregoing compounds having the tetralin ring represented by the general formula (1) are all the compounds having a hydrogen atom in the benzylic position of the tetralin ring, and are used in combination with the foregoing transition metal catalyst to undergo the abstraction of the hydrogen atom at the benzylic position so as to thereby develop an excellent oxygen absorbing capacity.

The oxygen absorbent composition of the present embodiment is suppressed in the increase of the odor intensity after the absorption of oxygen. The reason for the suppression is not clear, but the following oxidation reaction mechanism is inferred to be involved. Specifically, it is interpreted that in the compound having the tetralin ring represented by the general formula (1), first the hydrogen atom located at the benzylic position of the tetralin ring is abstracted to produce a radical, and subsequently, the reaction between the radical and oxygen oxidizes the carbon atom at the benzyl opposition to produce a hydroxy group or a ketone group. Accordingly, it is inferred that the oxygen absorbent composition of the present embodiment does not involve the breakage of the molecule chain of the main oxygen-absorbent due to oxidation reaction, as occurring in the conventional technique, thus maintains the structure of the main oxygen-absorbent (compound), accordingly hardly produces, after the absorption of oxygen, a low molecular weight organic compound to be a cause for odor, and consequently suppresses the increase of the odor intensity after the absorption of oxygen.

The molecular weight of the foregoing compound having the tetralin ring represented by the general formula (1) can be appropriately regulated, without being particularly limited, according to the intended properties and the substituents $R_1$ to $R_8$ to be introduced. From the viewpoint of suppressing the loss of the compound during use and, at the same time, increasing the oxygen absorption amount per unit mass of the compound, the molecular weight of the compound is preferably in a range from 190 to 1500 and more preferably in a range from 210 to 1200, and furthermore preferably in a range from 250 to 1000. The foregoing compounds having the tetralin ring represented by the general formula (1) can be used each alone or in combinations of two or more thereof.

Among the foregoing compounds having the tetralin ring represented by the general formula (1), the compounds having a higher boiling point, namely, having a lower vapor pressure at the time of use are preferably used, from the viewpoint of suppressing the loss of the compounds due to the volatilization at the time of use. For example, when the oxygen absorbent composition of the present embodiment is used as the below-described oxygen-absorbing resin composition, the compound having the lower vapor pressure at the temperature in the kneading with the thermoplastic resin is the more preferable because the loss, due to volatilization, of the compound at the time of the production of the oxygen-absorbing resin composition can be suppressed. As the index for such loss due to volatilization, for example, the 3% weight decrease temperature can be adopted. Specifically, the 3% weight decrease temperature of the compound is preferably 100° C. or higher, more preferably 150° C. or higher and furthermore preferably 200° C. or higher. The upper limit of the 3% weight decrease temperature is not particularly limited.

As the transition metal catalyst used in the oxygen absorbent composition of the present embodiment, a transition metal catalyst appropriately selected from the heretofore known transition metal catalysts can be used, without being particularly limited, as long as the selected transition catalyst can function as the catalyst for the oxidation reaction of the compound having the tetralin ring.

Specific examples of such a transition metal catalyst include organic acid salts, halides, phosphates, phosphites, hypophosphites, nitrates, sulfates, oxides and hydroxides of transition metals. Examples of the transition metal contained in the transition metal catalyst include, without being limited to: titanium, vanadium, chromium, manganese, iron, cobalt, nickel, copper, zinc, ruthenium and rhodium. Among these, manganese, iron, cobalt, nickel and copper are preferable. Examples of the organic acid include, without being limited to: acetic acid, propionic acid, octanoic acid, lauric acid, stearic acid, acetylacetone, dimethyldithio carbamic acid, palmitic acid, 2-ethylhexanoic acid, neodecanoic acid, linoleic acid, toluic acid, oleic acid, capric acid and naphthenic acid. The transition metal catalyst is preferably the combinations of these transition metals and these organic acids, and the combination of the transition metal such as manganese, iron, cobalt, nickel or copper and the organic acid such as acetic acid, stearic acid, 2-ethylhexanoic acid, oleic acid or naphthenic acid is more preferable. The transition metal catalyst can be used each alone or in combinations of two or more thereof.

The mixing amount of the transition metal catalyst can be appropriately set according to the types and intended performances of the compound and the transition metal catalyst to be used, without being particularly limited. From the viewpoint of the oxygen absorption amount of the oxygen absorbent composition, the mixing amount of the transition metal catalyst is preferably 0.001 to 10 parts by mass, more preferably 0.002 to 2 parts by mass and furthermore preferably 0.005 to 1 part by mass, in terms of the transition metal amount, based on 100 parts by mass of the compound having the tetralin ring represented by the general formula (1).

The foregoing oxygen absorbent composition of the present embodiment can be used as an oxygen absorbent as it is as a mixture composed of the compound and the transition metal catalyst. Alternatively, by applying, for example, a granulation or molding method, the foregoing oxygen absorbent composition of the present embodiment is processed into a powdery material, a granular material, a pellet type material or any other small piece type material, and the resulting material can also be used as an oxygen absorbent.

The oxygen absorbent composition of the present embodiment may also further include a carrier substance, if necessary. In this case, the oxygen absorbent composition including the carrier substance can be used as an oxygen absorbent as it is as a mixture composed of the compound, the transition metal catalyst and the carrier substance. Alternatively, by allowing a carrier substance to support or to be impregnated with the foregoing compound having the tetralin ring represented by the general formula (1), together with the transition metal catalyst, if necessary, it is possible to prepare a support (hereinafter, also referred to as "oxygen absorbent support") in which the compound is supported by or impregnated into the carrier substance, and the resulting support can also be used as an oxygen absorbent. By allowing the carrier substance to support or to be impregnated with the compound, the contact area with oxygen can be made larger and the oxygen absorption rate or the oxygen absorption amount can be increased, and the handling of the oxygen absorbent can be made simple and convenient.

As the carrier substance, a carrier substance can be appropriately selected to be used among carrier substances heretofore known in the art. Specific examples of such a carrier substance include, without being particularly limited to: powders of synthetic calcium silicate, hydrated lime, activated carbon, zeolite, perlite, diatom earth, activated clay, silica, kaolin, talc, bentonite, activated alumina, gypsum, silica alumina, calcium silicate, magnesium oxide, graphite, carbon black, aluminum hydroxide and iron oxide. Among these, synthetic calcium silicate, diatom earth, silica and activated carbon are preferably used. The carrier substances can be each alone or in combinations of two or more thereof.

The mixing amount of the carrier substance can be appropriately set according to the types and intended performances of the compound and the transition metal catalyst to be used, without being particularly limited; however, the mixing amount of the carrier substance is preferably 10 to 1000 parts by mass and more preferably 20 to 800 parts by mass based on 100 parts by mass of the compound having the tetralin ring represented by the general formula (1).

The support of the compound by the carrier substance can be performed according to a conventional method, without being particularly limited. For example, a liquid mixture containing the foregoing compound having the tetralin ring represented by the general formula (1) or a liquid mixture containing the compound and a transition metal catalyst is prepared, the liquid mixture is applied to the carrier substance, or the carrier substance is immersed in the liquid mixture, and thus it is possible to obtain an oxygen absorbent support in which the compound (and if necessary, a transition metal catalyst) is supported by (impregnated into) the carrier substance. When the liquid mixture is prepared, a solvent can further be included. When the compound or the transition metal catalyst is solid, the use of a solvent allows the compound or the transition metal catalyst to be efficiently supported by the carrier substance. The solvent to be used herein can appropriately be selected to be used from the heretofore known solvents in consideration of the solubilities of the compound and the transition metal catalyst. Examples of the preferable solvents include, without being particularly limited to: organic solvents such as methanol, 2-propanol, ethylene glycol, toluene, xylene, methyl acetate, ethyl acetate, butyl acetate, diisopropyl ether, tetrahydrofuran, methyl ethyl ketone, dichloromethane and chloroform; among these, methanol, 2-propanol, ethyl acetate and methyl ethyl ketone are more preferable. The solvents can be used each alone or in combinations of two or more thereof.

The oxygen absorbent composition of the present embodiment may also further include a thermoplastic resin, if necessary (this aspect is also referred to as "the oxygen-absorbing resin composition"). In this case, the forms of inclusion of the compound and the transition metal catalyst in the oxygen-absorbing resin composition are not particularly limited. For example, the compound and the transition metal catalyst may be included as they are in the thermoplastic resin, or alternatively, the compound and the transition metal catalyst may be included, in the state of being supported by the foregoing carrier substance, in thermoplastic resin.

The preparation of the oxygen-absorbing resin composition can be performed according to a conventional method, without being particularly limited. For example, the compound and the transition metal catalyst, and the carrier substance mixed according to need are mixed in or kneaded with the thermoplastic resin, and thus the oxygen-absorbing resin composition can be obtained.

Then, the oxygen-absorbing resin composition is molded into an intended shape by applying a heretofore known molding method such as extrusion molding, and thus a resin molded article (hereinafter, also referred to as "the oxygen-absorbing resin molded article") as an aspect of the oxygen absorbent can be obtained. The oxygen-absorbing resin molded article can have an optional shape such as a particulate shape, a granular shape, a pellet shape or other small piece type shapes, or a film shape or a sheet shape, without being particularly limited. By applying a molding method such as vacuum molding, compressed-air molding and plug-assist molding, the oxygen-absorbing resin molded article is also allowed to be a vessel, a lid member or the like such as a tray, a cup, a bottle or a tube. In addition, the oxygen-absorbing resin composition can also be molded into a film shape or a sheet shape, and these can also be made to have a form of a label, a card, a packing or the like.

As the thermoplastic resin, heretofore known thermoplastic resins can be appropriately used. Examples of the thermoplastic resins include, without being particularly limited to: polyolefins such as low density polyethylene, medium density polyethylene, high density polyethylene, linear low density polyethylene, linear ultra low density polyethylene, polypropylene, poly-1-butene, poly-4-methyl-1-pentene, and random or block copolymers of α-olefins such as ethylene, propylene, 1-butene and 4-methyl-1-pentene; acid-modified polyolefins such as maleic anhydride graft polyethylene and maleic anhydride graft polypropylene; ethylene-vinyl compound copolymers such as ethylene-vinyl acetate copolymer, ethylene-vinyl alcohol copolymer, ethylene-vinyl chloride copolymer, ethylene-(meth)acrylic acid copolymer and ionically cross-linked products (ionomers) thereof, and ethylene-methyl methacrylate copolymer; styrene-based resins such as polystyrene, acrylonitrile-styrene copolymer and α-methyl styrene-styrene copolymer; polyvinyl compounds such as polymethyl acrylate and polymethyl methacrylate; polyamides such as nylon 6, nylon 66, nylon 610, nylon 12 and polymethaxylylene adipamide (MXD6); polyesters such as polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone and polyhydroxyalkanoate; polycarbonate; polyethers such as polyethylene oxide, or mixtures of these. The thermoplastic resins can be used each alone or in combinations of two or more thereof.

Among these, the thermoplastic resin is preferably at least one selected from the group consisting of polyolefin, polyester, polyamide, polyvinyl alcohol and polyvinyl chloride. Hereinafter, these preferable thermoplastic resins are described in detail.

Examples of the polyolefin include: olefin homopolymers such as polyethylenes such as low density polyethylene, medium density polyethylene, high density polyethylene, linear low density polyethylene and linear ultra low density polyethylene, and polypropylene, polybutene-1 and poly-4-methyl-pentene-1; copolymers between ethylene and an α-olefin such as ethylene-propylene random copolymer, ethylene-propylene block copolymer, ethylene-propylene-polybutene-1 copolymer and ethylene-cyclic olefin copolymer; other ethylene copolymers such as ethylene-α,β-unsaturated carboxylic acid copolymer, ethylene-α,β-unsaturated carboxylic acid ester copolymer, ionically cross-linked products of ethylene-α,β-unsaturated carboxylic acid copolymer, ethylene-vinyl acetate copolymer, and partial or complete saponification products of ethylene-vinyl acetate copolymer; copolymers prepared from raw materials of olefins such as norbornene and ethylene, cycloolefin copolymers (COCs) such as copolymers prepared from raw materials of olefins such as tetracyclododecene and ethylene, and cycloolefin polymers (COPs) such as a polymer prepared by ring-opening polymerization of norbornene followed by hydrogenation; and graft-modified polyolefins prepared by graft modification of these polyolefins with acid anhydrides such as maleic anhydride.

The polyester as referred to herein means the polyesters obtained from one or two or more selected from polybasic carboxylic acids inclusive of dicarboxylic acids and ester-forming derivatives of these and one or two or more selected from polyhydric alcohols inclusive of glycols; polyesters obtained from hydroxy carboxylic acids and ester-forming derivatives of these; or polyesters composed of cyclic esters.

Examples of the dicarboxylic acid include: saturated aliphatic dicarboxylic acids exemplified by oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimeric acid, or ester-forming derivatives of these; unsaturated aliphatic dicarboxylic acids exemplified by fumaric acid, maleic acid and itaconic acid, or ester-forming derivatives of these; aromatic dicarboxylic acids exemplified by orthophthalic acid, isophthalic acid, terephthalic acid, diphenic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyl dicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, pamoic acid and anthracene dicarboxylic acid, or ester-forming derivatives of these; and metal sulfonate group containing aromatic dicarboxylic acids exemplified by 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid, or lower alkyl ester derivatives of these.

Among the foregoing dicarboxylic acids, the use of terephthalic acid, isophthalic acid or naphthalene dicarboxylic acid is preferable from the viewpoint of, for example, the physical properties of the obtained polyester. If necessary, other dicarboxylic acids may also be copolymerized.

Examples of the polybasic carboxylic acids other than these dicarboxylic acids include: ethane tricarboxylic acid, propane tricarboxylic acid, butane tetracarboxylic acid, pyromellitic acid, trimellitic acid, trimesic acid, 3,4,3',4'-biphenyl tetracarboxylic acid, and ester-forming derivatives of these.

Examples of the glycols include: aliphatic glycols exemplified by ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecanediol, polyethylene glycol, polytrimethylene glycol and polytetramethylene glycol; aromatic glycols exemplified by hydroquinone, 4,4'-dihydroxybisphenol, 1,4-bis((3-hydroxy ethoxy)benzene, 1,4-bis(β-hydroxy ethoxy phenyl) sulfone, bis(p-hydroxyphenyl)ether, bis(p-hydroxyphenyl) sulfone, bis(p-hydroxyphenyl)methane, 1,2-bis(p-hydroxyphenyl)ethane, bisphenol A, bisphenol C and 2,5-naphthalenediol; and glycols obtained by adding ethylene oxide to these glycols.

Among the foregoing glycols, it is preferable to use as the main component ethylene glycol, 1,3-propylene glycol, 1,4-butylene glycol or 1,4-cyclohexane dimethanol.

Examples of the polyhydric alcohols other than these glycols include: trimethylolmethane, trimethylolethane, trimethylolpropane, pentaerythritol, glycerol and hexanetriol.

Examples of the hydroxy carboxylic acids include lactic acid, citric acid, malic acid, tartaric acid, hydroxyacetic acid, 3-hydroxylactic acid, p-hydroxybenzoic acid, p-(2-hydroxyethoxy)benzoic acid and 4-hydroxy cyclohexane carboxylic acid, or ester-forming derivatives of these.

Examples of the cyclic esters include ε-caprolactone, β-propiolactone, β-methyl-β-propiolactone, δ-valerolactone, glycolide and lactide.

Examples of the ester-forming derivatives of the polybasic carboxylic acids and hydroxy carboxylic acids include the alkyl esters, acid chlorides and acid anhydrides of these.

Among the foregoing polyesters, polyesters including as the main acid component terephthalic acid or an ester-forming derivative thereof, or naphthalene dicarboxylic acid or an ester-forming derivative thereof, and including as the main glycol component an alkylene glycol are preferable.

The polyester including as the main acid component terephthalic acid or an ester-forming derivative thereof is a polyester including terephthalic acid or the ester-forming derivative thereof in a total amount of preferably 70 mol % or more, more preferably 80 mol % or more and furthermore preferably 90 mol % or more, based on the whole acid components.

The polyester including as the main acid component naphthalene dicarboxylic acid or an ester-forming derivative thereof is a polyester including naphthalene dicarboxylic acid or the ester-forming derivative thereof in a total amount of preferably 70 mol % or more, more preferably 80 mol % or more and furthermore preferably 90 mol % or more, based on the whole acid components.

Examples of the foregoing naphthalene dicarboxylic acid or the ester-forming derivative thereof include 1,3-naphthalene dicarboxylic acid, 1,4-naphthalene dicarboxylic acid, 1,5-naphthalene dicarboxylic acid, 2,6-naphthalene dicarboxylic acid and 2,7-naphthalene dicarboxylic acid, being quoted in the foregoing dicarboxylic acids, or ester-forming derivatives of these.

The polyester including as the main glycol component alkylene glycols is a polyester including the alkylene glycols in a total amount of preferably 70 mol % or more, more preferably 80 mol % or more and furthermore preferably 90 mol % or more, based on the whole glycol components. The alkylene glycols as referred to herein may include in the molecule chain thereof a substituent(s) or an alicyclic structure(s).

The copolymerization component other than the terephthalic acid/ethylene glycol is preferably, from the viewpoint of the compatibility between transparency and moldability, at least one or more selected from the group consisting of isophthalic acid, 2,6-naphthalene dicarboxylic acid, diethylene glycol, neopentyl glycol, 1,4-cyclohexane dimethanol, 1,2-propanediol, 1,3-propanediol and 2-methyl-1,3-propanediol, and is more preferably at least one or more selected from the group consisting of isophthalic acid, diethylene glycol, neopentyl glycol and 1,4-cyclohexane dimethanol.

A preferable example of the polyester used in the oxygen absorbent composition of the present embodiment is a polyester in which the main repeating unit is composed of ethylene terephthalate; the polyester is more preferably a linear polyester containing 70 mol % or more of the ethylene-terephthalate unit, furthermore preferably a linear polyester containing 80 mol % or more of the ethylene-terephthalate unit, and particularly preferably a linear polyester containing 90 mol % or more of the ethylene terephthalate unit.

Another preferable example of the polyester used in the oxygen absorbent composition of the present embodiment is a polyester in which the main repeating unit is constituted with ethylene-2,6-naphthalate; the polyester is more preferably a linear polyester containing 70 mol % or more of the thylene-2,6-naphthalate unit, furthermore preferably a linear polyester containing 80 mol % or more of the ethylene-2, 6-naphthalate and particularly preferably a linear polyester containing 90 mol % or more of the ethylene-2,6-naphthalate.

In addition, yet another preferable example of the polyester used in the oxygen absorbent composition of the present embodiment is: a linear polyester containing 70 mol % or more of the propylene terephthalate unit; a linear polyester containing 70 mol % or more of the propylene naphthalate unit; a linear polyester containing 70 mol % or more of the 1,4-cyclohexane dimethylene terephthalate unit; a linear polyester containing 70 mol % or more of the butylene naphthalate unit; or a linear polyester containing 70 mol % or more of butylene terephthalate unit.

As still yet another preferable example of the polyester used in the oxygen absorbent composition of the present embodiment, polyglycolic acid obtained by the polycondensation of glycolic acid or methyl glycolate, or by ring-opening polycondensation of glycolide is quoted. The polyglycolic acid may be a polyglycolic acid copolymerized with other components such as lactide.

As the polyester particularly preferably used from the viewpoint of the compatibility between transparency and moldability, the composition of the whole polyester are a combination of terephthalic acid/isophthalic acid/ethylene glycol, a combination of terephthalic acid/ethylene glycol/1,4-cyclohexane dimethanol and a combination of terephthalic acid/ethylene glycol/neopentyl glycol. As a matter of course, the foregoing polyester may include a small amount (5 mol % or less) of diethylene glycol produced by the dimerization of ethylene glycol during the esterification (transesterification) reaction or the polycondensation reaction.

Examples of the polyamide include: a polyamide including as the main constitutional unit the unit derived from lactam or an amino carboxylic acid; an aliphatic polyamide including as the main constitutional unit the unit derived from an aliphatic diamine and an aliphatic dicarboxylic acid; a partially aromatic polyamide including as the main constitutional unit the unit derived from an aliphatic diamine and an aromatic dicarboxylic acid; and a partially aromatic polyamide including as the main constitutional unit the unit derived from an aromatic diamine and an aliphatic dicarboxylic acid. The polyamide as referred to herein may be a polymer obtained by copolymerizing the monomer units other than the main constitutional unit, if necessary.

Examples of the lactam or the amino carboxylic acid include lactams such as ε-caprolactam and laurolactam; amino carboxylic acids such as amino caproic acid and amino undecanoic acid; and aromatic amino carboxylic acids such as p-amino methyl benzoic acid.

Examples of the aliphatic diamine include aliphatic diamines having 2 to 12 carbon atoms or functional derivatives thereof, and alicyclic diamines having 2 to 12 carbon atoms. The aliphatic diamine may be a linear aliphatic diamine or a branched chain aliphatic diamine. Specific examples of the linear aliphatic diamine include: aliphatic diamines such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine. Specific examples of the alicyclic diamine include cyclohexanediamine, 1,3-bis(aminomethyl)cyclohexane and 1,4-bis(aminomethyl)cyclohexane.

As the aliphatic dicarboxylic acid, for example, linear aliphatic dicarboxylic acids and alicyclic dicarboxylic acids are preferable, and linear aliphatic dicarboxylic acids having an alkylene group having 4 to 12 carbon atoms are more preferable. Specific examples of such a linear aliphatic dicarboxylic acid include: adipic acid, sebacic acid, malonic acid, succinic acid, glutaric acid, pimelic acid, suberic acid, azelaic acid, undecanoic acid, undecanedioic acid, dodecanedioic acid and dimeric acid, and functional derivatives of these. Specific examples of such an alicyclic dicarboxylic acid include: 1,4-cyclohexanedicarboxylic acid, hexahydroterephthalic acid and hexahydroisophthalic acid.

Examples of the aromatic diamine include metaxylylenediamine, paraxylylenediamine and para-bis(2-aminoethyl)benzene.

Examples of the aromatic dicarboxylic acid include terephthalic acid, isophthalic acid, phthalic acid, 2,6-naphthalene dicarboxylic acid, diphenyl-4,4'-dicarboxylic acid and diphenoxyethane dicarboxylic acid, and functional derivatives of these.

Specific example of the polyamide include, without being particularly limited to: polyamide 4, polyamide 6, polyamide 10, polyamide 11, polyamide 12, polyamide 4,6, polyamide 6,6, polyamide 6,10, polyamide 6T, polyamide 9T, polyamide 6IT, polymethaxylylene adipamide (polyamide MXD6), isophthalic acid copolymerized polymetaxylylene adipamide (polyamide MXD6I), polymetaxylylene sebacamide (polyamide MXD10), polymetaxylylene dodecanamide (polyamide MXD12), poly-1,3-bisaminocyclohexane adipamide (polyamide BAC6) and polyparaxylylene sebacamide (polyamide PXD10). Examples of the preferable polyamide used in the oxygen absorbent composition of the present embodiment include polyamide 6, polyamide MXD6 and polyamide MXD6I.

Examples of the copolymerization component which may be copolymerized with the foregoing polyamides include: a polyether having at least one terminal amino group or one terminal carboxyl group and having a number average molecular weight of 2000 to 20000, an organic carboxylic acid salt of the polyether having the terminal amino group, and an amino salt of the polyether having the terminal carboxyl group. Specific examples of such a copolymerization component include bis(aminopropyl)poly(ethylene oxide) (polyethylene glycol having a number average molecular weight of 2000 to 20000).

The partially aromatic polyamide may include a constitutional unit derived from a tribasic or higher polybasic carboxylic acid such as trimellitic acid or pyromellitic acid, within a range of substantially being linear.

Examples of the polyvinyl alcohol include polyvinyl alcohol, ethylene-vinyl alcohol copolymer and partially or completely saponificated products of these. As the polyvinyl alcohol, modified products thereof may also be adopted.

Examples of polyvinyl chloride include polyvinyl chloride, polyvinylidene chloride, and copolymers of these with vinyl acetate, maleic acid derivatives, and higher alkyl vinyl ethers.

Among the thermoplastic resins presented as examples, linear low density polyethylene (LLDPE), ethylene-vinyl alcohol copolymer (EVOH), nylon 6 (PA6), polyethylene terephthalate (PET) and polyvinyl chloride (PVC) preferably used as food packaging materials.

When the oxygen absorbent composition of the present embodiment includes a thermoplastic resin, the mixing amount of the thermoplastic resin is, from the viewpoint of the oxygen absorption performance, and the moldability and exterior appearance of the resin molded article, preferably 1 to 10,000 parts by mass, more preferably 20 to 5,000 parts by mass, furthermore preferably 50 to 3,000 parts by mass and particularly preferably 100 to 2,000 parts by mass based on 100 parts by mass of the compound having the tetralin skeleton represented by the general formula (1).

The oxygen absorbent composition of the present embodiment may further include, if necessary, a radical generating agent or a photoinitiator in order to promote the oxygen absorption reaction. Specific examples of the radical generating agent include, without being particularly limited to: various N-hydroxyimide compounds, such as N-hydroxysuccinimide, N-hydroxymaleimide, N,N'-dihydroxy-cyclohexane-tetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy het acid imide, N-hydroxy hymic acid imide, N-hydroxy trimellitic acid imide and N,N-dihydroxy pyromellitic acid diimide. Specific examples of the photoinitiator include, without being particularly limited to: benzophenone and derivatives thereof, thiazine dyes, metal porphyrin derivatives and anthraquinone derivatives. These radical generating agents and photoinitiators can be used each alone or in combinations of two or more thereof.

The oxygen-absorbing resin composition may include various additives heretofore known in the art, within the range not impairing the advantageous effects of the present embodiment. Examples of such optional components include, without being particularly limited to: fillers such as calcium carbonate, clay, mica and silica; drying agents; pigments; dyes; antioxidants; slipping agents; antistatic agents; stabilizers; plasticizers; and deodorants.

(Oxygen Absorbent Package)

The oxygen absorbent package of the present embodiment can be obtained by packing the foregoing oxygen absorbent composition, for example, in the form of a small bag shape.

Here, as the air permeable packaging material, heretofore known packaging materials having air permeability can be applied without being particularly limited. From the viewpoint of sufficiently developing the oxygen absorption effect, an air permeable packaging material having a high air permeability is preferable, and a packaging material having a high air permeability used in application to oxygen absorbents is suitably used. Specific examples of the air permeable packaging material include, without being particularly limited to: papers such as Japanese paper, Western paper and rayon paper; non-woven fabrics using various fibers obtained from pulp, cellulose and synthesis resins; plastic films or perforated products thereof; or microporous films obtained by stretching after the addition of calcium carbonate or the like; and in addition, products obtained by laminating two or more selected from these. As the plastic film, for example, it is also possible to use a laminated film obtained by laminating on and bonding to each other a film of polyethylene terephthalate, polyamide, polypropylene or polycarbonate and a film of polyethylene, ionomer, polybutadiene, ethylene-acrylic acid copolymer, ethylene-methacrylic acid copolymer or ethylene-vinyl acetate copolymer.

The foregoing oxygen absorbent composition and oxygen-absorbing resin composition, and in addition, for example, the foregoing oxygen absorbent support, oxygen-absorbing resin molded article and oxygen absorbent package are used, external irradiation with an energy ray enables the promotion of the start of the oxygen absorption reaction or the increase of the oxygen absorption rate. As the energy ray, for example, visible ray, ultraviolet ray, X-ray, electron beam and γ-ray can be used. The irradiation energy quantity can be appropriately selected according to the type of the energy ray to be used.

As described above in detail, the foregoing oxygen absorbent composition and the articles constituted by using the oxygen absorbent composition have excellent oxygen absorption performance over a wide range of humidity conditions from a low humidity to a high humidity, can absorb oxygen irrespective as to whether or not the object to be stored has moisture, and hence can be used in a wide range of applications irrespective of the type of the object to be stored. In particular, the increase of the odor intensity after the absorption of oxygen is suppressed, the foregoing composition and articles can be particularly suitably used, for example, for food, prepared food, beverages, health food and pharmaceuticals. Specific examples of the objects to be stored include, without being particularly limited to: dried food such as ground coffee, coffee beans, rice, tea and beans; rice processed products such as polished rice, cooked rice, glutinous rice boiled with red beans, rice cakes, fried rice cakes and rice crackers; prepared foods such as soup, stew and curry; fruits; confectioneries such as bars of sweet jellied adzuki-bean paste, puddings, cakes and buns with bean jam filling; fishery products such as tuna, fish and shellfish; dairy processed products such as cheese, butter and eggs; processed meat products such as meat, salami, sausage and ham; powdered seasoning; vegetables such as carrot, potato, asparagus and shiitake mushroom; beverages such as beer, wine, fruit juice and carbonated soft drinks; health food such as vitamin preparations; and pharmaceuticals.

EXAMPLES

The present invention is described in more detail, with reference to Examples and Comparative Examples presented below, but the present invention is not limited at all by these Examples.

Example 1

A liquid mixture was prepared by mixing cobalt 2-ethylhexanoate so as to have an amount of 0.1 part by mass in terms of the amount of cobalt with 100 parts by mass of 1,5-dimethyltetralin; the resulting liquid mixture was impregnated into 130 parts by mass of diatom earth (trade name "RC417," manufactured by Showa Chemical Industry Co., Ltd.) to prepare a granular oxygen absorbent (oxygen absorbent support).

Next, two gas barrier bags formed of an aluminum foil laminate film were prepared. Then, 1 g of the obtained granular oxygen absorbent was packed, together with 1000 cc of air, in each of the two gas barrier bags; the relative humidity in one of the two bags was regulated at 100%, the relative humidity of the other of the two bags was regulated at 30%, and the two bags were each sealed. The sealed bodies thus obtained were stored at 23° C. for 7 days, and the total amount of oxygen absorbed by each of the sealed bodies during the time of the storage was measured.

Additionally, on the basis of the following evaluation standards, the odors before and after the oxygen absorption were organoleptically evaluated.

◎: The compound itself has no odor, and no odor is found either before or after the oxygen absorption.

○: The compound itself has somewhat odor, but no change of the odor is found either before or after the oxygen absorption.

X: The odor is increased after the absorption of oxygen.

The results thus obtained are shown in Table 1.

Example 2

A granular oxygen absorbent (oxygen absorbent support) was prepared in the same manner as in Example 1 except that a synthetic calcium silicate (trade name "Microcell E," manufactured by Celite Corp.) was used in place of diatom earth, and the measurement of the oxygen absorption amount and the organoleptic evaluation of the odors before and after the oxygen absorption of the resulting granular oxygen absorbent were performed. The results thus obtained are shown in Table 1.

Example 3

A granular oxygen absorbent (oxygen absorbent support) was prepared in the same manner as in Example 1 except that tetralin was used in place of 1,5-dimethyltetralin, and the measurement of the oxygen absorption amount and the organoleptic evaluation of the odors before and after the oxygen absorption of the resulting granular oxygen absorbent were performed. The results thus obtained are shown in Table 1.

Example 4

A granular oxygen absorbent (oxygen absorbent support) was prepared in the same manner as in Example 1 except that cobalt naphthenate was used in place of cobalt 2-ethylhexanoate, and the measurement of the oxygen absorption amount and the organoleptic evaluation of the odors before and after the oxygen absorption of the resulting granular oxygen absorbent were performed. The results thus obtained are shown in Table 1.

Example 5

A granular oxygen absorbent (oxygen absorbent support) was prepared in the same manner as in Example 1 except that manganese 2-ethylhexanoate was used in place of cobalt 2-ethylhexanoate, and the measurement of the oxygen absorption amount and the organoleptic evaluation of the odors before and after the oxygen absorption of the resulting granular oxygen absorbent were performed. The results thus obtained are shown in Table 1.

Example 6

A granular oxygen absorbent (oxygen absorbent support) was prepared in the same manner as in Example 1 except that 3,4,5,11-tetrahydroacenaphthene was used in place of 1,5-dimethyl tetralin, and the mixing amount of the synthetic calcium silicate was altered from 130 parts by mass to 50 parts by mass, and the measurement of the oxygen absorption amount and the organoleptic evaluation of the odors before and after the oxygen absorption of the resulting granular oxygen absorbent were performed. The results thus obtained are shown in Table 1.

Example 7

A liquid mixture was prepared by mixing cobalt naphthenate in an amount of 0.1 part by mass in terms of the amount of cobalt with 100 parts by mass of 1,5-dimethyltetralin; the resulting liquid mixture was added to 1000 parts by mass of silica sol (trade name "IPA-ST," manufactured by Nissan Chemical Industries, Ltd., containing 70% by mass of 2-propanol), the resulting mixture was stirred in a nitrogen atmosphere, at 60° C. for 1 hour, then 2-propanol was distilled off under a reduced pressure to convert the mixture into a powder, and thus a granular oxygen absorbent (oxygen absorbent support) was prepared.

The measurement of the oxygen absorption amount and the organoleptic evaluation of the odors before and after the oxygen absorption of the obtained granular oxygen absorbent were performed in the same manner as in Example 6 except that the obtained granular oxygen absorbent was used. The results thus obtained are shown in Table 1.

Example 8

A granular oxygen absorbent (oxygen absorbent support) was prepared in the same manner as in Example 7 except that 9,10-dihydroanthracene was used in place of 1,5-dimethyl tetralin, and the measurement of the oxygen absorption amount and the organoleptic evaluation of the odors before and after the oxygen absorption of the resulting granular oxygen absorbent were performed. The results thus obtained are shown in Table 1.

Example 9

A granular oxygen absorbent (oxygen absorbent support) was prepared in the same manner as in Example 7 except that dimethyl tetralin-2,6-dicarboxylate was used in place of 1,5-dimethyl tetralin, and the measurement of the oxygen absorption amount and the organoleptic evaluation of the odors before and after the oxygen absorption of the resulting granular oxygen absorbent were performed. The results thus obtained are shown in Table 1.

TABLE 1

| | Compound having tetralin ring | | Parts by mass based on 100 parts by mass of compound having tetralin ring | | | Oxygen absorption amount[1] cc/g-absorbent | | Oxygen absorption amount[2] cc/g-compound | | Odor |
|---|---|---|---|---|---|---|---|---|---|---|
| | | | Transition metal catalyst | | Carrier | | | | | |
| Type | Structural formula | Transition metal catalyst | Carrier substance | (in terms of metal amount) | substance | Humidity 100% | Humidity 30% | Humidity 100% | Humidity 30% | |
| Example 1  1,5-Dimethyltetralin | | Cobalt 2-ethylhexanoate | Diatom earth | 0.1 | 130 | 83 | 80 | 189 | 182 | ○ |
| Example 2  1,5-Dimethyltetralin | | Cobalt 2-ethylhexanoate | Synthetic calcium silicate | 0.1 | 130 | 80 | 49 | 182 | 111 | ○ |
| Example 3  Tetralin | | Cobalt 2-ethylhexanoate | Diatom earth | 0.1 | 130 | 60 | 53 | 136 | 120 | ○ |
| Example 4  1,5-Dimethyltetralin | | Cobalt naphthenate | Diatom earth | 0.1 | 130 | 80 | 80 | 182 | 182 | ○ |

TABLE 1-continued

| Type | Compound having tetralin ring | | Transition metal catalyst | | Parts by mass based on 100 parts by mass of compound having tetralin ring | | Oxygen absorption amount[1] cc/g-absorbent | | Oxygen absorption amount[2] cc/g-compound | | Odor |
|---|---|---|---|---|---|---|---|---|---|---|---|
| | Structural formula | | Transition metal catalyst | Carrier substance | (in terms of metal amount) | Carrier substance | Humidity 100% | Humidity 30% | Humidity 100% | Humidity 30% | |
| Example 5 1,5-Dimethyltetralin | | | Manganese 2-ethylhexanoate | Diatom earth | 0.1 | 130 | 78 | 76 | 177 | 173 | ◯ |
| Example 6 3,4,5,11-Tetrahydro-acenaphthene | | | Cobalt 2-ethylhexanoate | Synthetic calcium silicate | 0.1 | 50 | 198 | 163 | 296 | 243 | ◉ |
| Example 7 1,5-Dimethyltetralin | | | Cobalt 2-ethylhexanoate | Silica | 0.1 | 300 | 44 | 38 | 176 | 152 | ◯ |

TABLE 1-continued

| Compound having tetralin ring | | Transition metal catalyst | | | Oxygen absorption amount[1] cc/g-absorbent | | Oxygen absorption amount[2] cc/g-compound | | Odor |
|---|---|---|---|---|---|---|---|---|---|
| | | | | Parts by mass based on 100 parts by mass of compound having tetralin ring | | | | | |
| Type | Structural formula | catalyst | Carrier substance | Transition metal (in terms of metal amount) | Carrier substance | Humidity 100% | Humidity 30% | Humidity 100% | Humidity 30% | |
| Example 8 9,10-Dihydroanthracene | | Cobalt 2-ethylhexanoate | Silica | 0.1 | 300 | 12 | 31 | 48 | 124 | ◎ |
| Example 9 Dimethyl-tetralin-2,6-dicarboxylate | | Cobalt 2-ethylhexanoate | Silica | 0.1 | 300 | 3 | 23 | 12 | 92 | ◎ |

[1]Total amount of oxygen absorbed during 7 days from the start of the test (per 1 g of the oxygen absorbent).
[2]Total amount of oxygen absorbed during 7 days from the start of the test (per 1 g of the compound having a tetralin ring).

As can be seen from Examples 1 to 9, the oxygen absorbents of the present invention exhibited oxygen absorption performance both at a high humidity and at a low humidity.

Synthesis Example 1

Diester Compound A Having Tetralin Ring

In a reactor equipped with a thermometer, a partial condenser, a total condenser and a stirring device, 248 g (1.0 mol) of dimethyl tetralin-2,6-dicarboxylate, 296 g (4.0 mol) of n-butyl alcohol and 0.34 g of tetrabutyl titanate were placed, and the reaction mixture was increased in temperature to 115° C. in a nitrogen atmosphere and was allowed to react while the produced methanol was being removed from the reaction system. After the production of methanol ceased, the reaction mixture was cooled to room temperature, and the unreacted n-butyl alcohol was removed under reduced pressure removal to yield the diester compound A. By using a thermogravimetric/differential thermal analyzer (trade name: DTG-60, manufactured by Shimadzu Corp.), the 30 weight loss temperature of the obtained compound was measured. The structural formula and the 3% weight loss temperature of the obtained compound are shown in Table 2.

Synthesis Example 2

Diester Compound B Having Tetralin Ring

The diester compound B was obtained by performing the same operations as in the synthesis of the diester compound A except that n-hexyl alcohol was used in place of n-butyl alcohol, and the mixing amount of n-hexyl alcohol was set at 409 g (4.0 mol), and the reaction temperature was set at 150° C. The structural formula and the 3% weight loss temperature of the obtained compound are shown in Table 2.

Synthesis Example 3

Diester Compound C Having Tetralin Ring

The diester compound C was obtained by performing the same operations as in the synthesis of the diester compound A except that n-octyl alcohol was used in place of n-butyl alcohol, and the mixing amount of n-octyl alcohol was set at 521 g (4.0 mol), and the reaction temperature was set at 190° C., and by recrystallization after the unreacted n-octyl alcohol was removed under reduced pressure. The structural formula and the 3% weight loss temperature of the obtained compound are shown in Table 2.

Synthesis Example 4

Diamide Compound D Having Tetralin Ring

In an 2000-ml autoclave equipped with a thermometer and a stirring device, 248 g (1.0 mol) of dimethyl tetralin-2,6-dicarboxylate and 439 g (6.0 mol) of n-butyl amine were placed, the air inside the autoclave was replaced with nitrogen, and then the reaction mixture was increased in temperature to 220° C. and heated and stirred for 5 hours. Then the reaction mixture was cooled to room temperature and then filtered, and the diamide compound D was obtained by recrystallization. The structural formula and the 3% weight loss temperature of the obtained compound are shown in Table 2.

Synthesis Example 5

Diamide Compound E Having Tetralin Ring

The diamide compound E was obtained by performing the same operations as in the synthesis of the diamide compound D except that n-hexyl amine was used in place of n-butyl amine and the mixing amount of n-hexyl amine was set at 607 g (6.0 mol). The structural formula and the 3% weight loss temperature of the obtained compound are shown in Table 2.

Synthesis Example 6

Diamide Compound F Having Tetralin Ring

The diamide compound F was obtained by performing the same operations as in the synthesis of the diamide compound D except that n-octyl amine was used in place of n-butyl amine and the mixing amount of n-octyl amine was set at 775 g (6.0 mol). The structural formula and the 3% weight loss temperature of the obtained compound are shown in Table 2.

TABLE 2

| | Structural formula | Molecular weight | 3% Weight loss temperature (° C.) |
| --- | --- | --- | --- |
| Diester compound A | 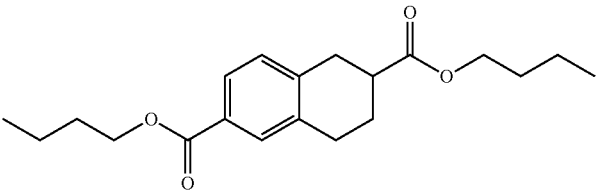 [SMILES: CCCCOC(=O)c1ccc2c(c1)CCC(C(=O)OCCCC)C2] | 332.4 | 223 |

TABLE 2-continued

| Structural formula | Molecular weight | 3% Weight loss temperature (° C.) |
|---|---|---|
| Diester compound B | 388.5 | 261 |
| Diester compound C | 444.7 | 262 |
| Diamide compound D | 330.5 | 275 |
| Diamide compound E | 386.6 | 290 |
| Diamide compound F | 442.7 | 307 |

Example 10

A liquid mixture was prepared by adding cobalt 2-ethylhexanoate in an amount of 0.1 part by mass in terms of the amount of cobalt to 100 parts by mass of the diester compound A.

Next, two gas barrier bags formed of an aluminum foil laminate film were prepared. Then, a sample prepared by wetting a piece of cotton with 1 g of the obtained liquid mixture was packed, together with 1000 cc of air, in each of the two gas barrier bags; the relative humidity in one of the two bags was regulated at 100%, the relative humidity of the other of the two bags was regulated at 30%, and the two bags were each sealed. The sealed bodies thus obtained were stored at 23° C. for 14 days, and the total amount of oxygen absorbed by each of the sealed bodies during the time of the storage was measured. In the same manner as in Example 1, the measurement of the oxygen absorption amount and the organoleptic evaluation of the odors before and after the oxygen absorption were performed. The results thus obtained are shown in Table 3.

Example 11

A liquid mixture was prepared in the same manner as in Example 10 except that the mixing amount of cobalt 2-ethylhexanoate was altered to be 0.05 part by mass in terms of the amount of cobalt, and the measurement of the oxygen absorption amount and the organoleptic evaluation of the odors before and after the oxygen absorption were performed. The results thus obtained are shown in Table 3.

Example 12

A liquid mixture was prepared in the same manner as in Example 10 except that the mixing amount of cobalt 2-ethylhexanoate was altered to be 0.025 part by mass in terms of the amount of cobalt, and the measurement of the oxygen absorption amount and the organoleptic evaluation of the odors before and after the oxygen absorption were performed. The results thus obtained are shown in Table 3.

Example 13

A liquid mixture was prepared in the same manner as in Example 10 except that the mixing amount of cobalt 2-ethylhexanoate was altered to be 0.01 part by mass in terms of the amount of cobalt, and the measurement of the oxygen absorption amount and the organoleptic evaluation of the odors before and after the oxygen absorption were performed. The results thus obtained are shown in Table 3.

Example 14

A granular oxygen absorbent (oxygen absorbent support) was prepared by impregnating 50 parts by mass of the synthetic calcium silicate (trade name "Microcell E," manufactured by Celite Corp.) with 100 parts by mass of the liquid mixture prepared in Example 10. The measurement of the oxygen absorption amount and the organoleptic evaluation of the odors before and after the oxygen absorption of the obtained granular oxygen absorbent were performed in the same manner as in Example 10 except that 1 g of the obtained granular oxygen absorbent was used. The results thus obtained are shown in Table 3.

Example 15

By adding 100 parts by mass of the liquid mixture prepared in Example 10 to 750 parts by mass of silica sol (trade name "MEK-ST 40D," manufactured by Nissan Chemical Industries, Ltd., containing 60% by mass of methyl ethyl ketone), the resulting mixture was stirred in a nitrogen atmosphere, at 60° C. for 1 hour, then methyl ethyl ketone was distilled off under a reduced pressure to convert the mixture into a powder, and thus a granular oxygen absorbent (oxygen absorbent support) was prepared. The measurement of the oxygen absorption amount and the organoleptic evaluation of the odors before and after the oxygen absorption of the obtained oxygen absorbent were performed in the same manner as in Example 14 except that 1 g of the obtained oxygen absorbent was used. The results thus obtained are shown in Table 3.

Example 16

A liquid mixture was prepared in the same manner as in Example 10 except that the diester compound B was used in place of the diester compound A, and the measurement of the oxygen absorption amount and the organoleptic evaluation of the odors before and after the oxygen absorption were performed. The results thus obtained are shown in Table 3.

Example 17

A granular oxygen absorbent (oxygen absorbent support) was prepared in the same manner as in Example 14 except that the diester compound B was used in place of the diester compound A, and the measurement of the oxygen absorption amount and the organoleptic evaluation of the odors before and after the oxygen absorption of the granular oxygen absorbent were performed. The results thus obtained are shown in Table 3.

Example 18

A granular oxygen absorbent (oxygen absorbent support) was prepared in the same manner as in Example 15 except that the diester compound B was used in place of the diester compound A, and the measurement of the oxygen absorption amount and the organoleptic evaluation of the odors before and after the oxygen absorption of the granular oxygen absorbent were performed. The results thus obtained are shown in Table 3.

Example 19

To 750 parts by mass of silica sol (trade name "MEK-ST 40D," manufactured by Nissan Chemical Industries, Ltd., containing 60% by mass of methyl ethyl ketone), 100 parts by mass of diester compound C and cobalt 2-ethylhexanoate in an amount of 0.1 part by mass in terms of the amount of cobalt, and the resulting mixture was stirred in a nitrogen atmosphere at 60° C. for 1 hour, then the methyl ethyl ketone was distilled off under reduced pressure to convert the mixture into a powder, and the and thus a granular oxygen absorbent (oxygen absorbent support) was prepared. In the same manner as in Example 15, except that 1 g of the obtained oxygen absorbent was used, a granular oxygen absorbent (oxygen absorbent support) was prepared, and the measurement of the oxygen absorption amount and the organoleptic evaluation of the odors before and after the oxygen absorption of the granular oxygen absorbent were performed. The results thus obtained are shown in Table 3.

Example 20

A granular oxygen absorbent (oxygen absorbent support) was prepared in the same manner as in Example 19 except that the diamide compound D was used in place of the diester compound C, and the measurement of the oxygen absorption amount and the organoleptic evaluation of the odors before and after the oxygen absorption of the granular oxygen absorbent were performed. The results thus obtained are shown in Table 3.

Example 21

A granular oxygen absorbent (oxygen absorbent support) was prepared in the same manner as in Example 19 except that the diamide compound E was used in place of the diester compound C, and the measurement of the oxygen absorption amount and the organoleptic evaluation of the odors before and after the oxygen absorption of the granular oxygen absorbent were performed. The results thus obtained are shown in Table 3.

Example 22

A granular oxygen absorbent (oxygen absorbent support) was prepared in the same manner as in Example 19 except that the diamide compound F was used in place of the diester compound C, and the measurement of the oxygen absorption amount and the organoleptic evaluation of the odors before and after the oxygen absorption of the granular oxygen absorbent were performed. The results thus obtained are shown in Table 3.

TABLE 3

| | Compound | Carrier substance | Parts by mass based on 100 parts by mass of compound having tetralin ring | | Oxygen absorption amount[1] cc/g-absorbent | | Oxygen absorption amount[2] cc/g-compound | | Odor |
|---|---|---|---|---|---|---|---|---|---|
| | | | Transition metal catalyst (in terms of metal amount) | Carrier substance | Humidity 100% | Humidity 30% | Humidity 100% | Humidity 30% | |
| Example 10 | Diester compound A | Not supported | 0.1 | — | — | — | 53 | 50 | ◎ |
| Example 11 | Diester compound A | Not supported | 0.05 | — | — | — | 48 | 45 | ◎ |
| Example 12 | Diester compound A | Not supported | 0.025 | — | — | — | 38 | 39 | ◎ |
| Example 13 | Diester compound A | Not supported | 0.01 | — | — | — | 24 | 24 | ◎ |
| Example 14 | Diester compound A | Synthetic calcium silicate | 0.1 | 50 | 5 | 14 | 7 | 21 | ◎ |
| Example 15 | Diester compound A | Silica | 0.1 | 300 | 4 | 18 | 14 | 70 | ◎ |
| Example 16 | Diester compound B | Not supported | 0.1 | — | — | — | 24 | 30 | ◎ |
| Example 17 | Diester compound B | Synthetic calcium silicate | 0.1 | 50 | 4 | 8 | 6 | 12 | ◎ |
| Example 18 | Diester compound B | Silica | 0.1 | 300 | 3 | 11 | 13 | 45 | ◎ |
| Example 19 | Diester compound C | Silica | 0.1 | 300 | 3 | 5 | 12 | 18 | ◎ |
| Example 20 | Diamide compound D | Silica | 0.1 | 300 | 6 | 4 | 24 | 14 | ◎ |
| Example 21 | Diamide compound E | Silica | 0.1 | 300 | 6 | 3 | 24 | 10 | ◎ |
| Example 22 | Diamide compound F | Silica | 0.1 | 300 | 4 | 2 | 15 | 8 | ◎ |

[1]Total amount of oxygen absorbed during 14 days from the start of the test (per 1 g of the oxygen absorbent).
[2]Total amount of oxygen absorbed during 14 days from the start of the test (per 1 g of the compound having a tetralin ring).

Example 23

With 100 parts by mass of polyethylene terephthalate (trade name: "Unipet RT553C" hereinafter denoted as PET, manufactured by Nippon Unipet Co., Ltd.), 10 parts by mass of diester compound A was mixed; with the mixture, cobalt stearate was mixed in a content of 500 ppm in terms of the cobalt content, and then the resulting mixture was melt kneaded at 260° C. to prepare an oxygen-absorbing resin composition. Next, the obtained oxygen-absorbing resin composition was heat pressed to prepare a single layer film (oxygen-absorbing resin molded article) having a thickness of 100 μm.

The oxygen absorption performance of the single layer film was evaluated by the following procedure. First, the single layer film was cut out to a size of 100 cm$^2$, to prepare a sample. Next, two three side sealed 24 cm×20 cm bags formed of an aluminum foil laminate film were prepared. Then, the obtained sample film was packed in each of the three-side sealed bags together with 500 cc of air; the relative humidity in one of the two bags was regulated at 100%, the relative humidity of the other of the two bags was regulated at 30%, and the two bags were each sealed. The sealed bodies thus obtained were stored at 40° C. for 14 days, and then the oxygen concentration in each of the bags was measured with an oxygen concentration meter (LC-750F, manufactured by Toray Engineering Co., Ltd.), and from the oxygen concentration thus obtained, the oxygen amount in each of the bags was calculated. Also, in the same manner as in Example 1, the organoleptic evaluation of the odors before and after the oxygen absorption was performed for each of the bags.

The results thus obtained are shown in Table 4.

Example 24

A single layer film was prepared in the same manner as in Example 23 except that the diester compound B was used in place of the diester compound A, and the measurement of the oxygen absorption amount and the organoleptic evaluation of the odors before and after the oxygen absorption of the single layer film were performed. The results thus obtained are shown in Table 4.

Example 25

A single layer film was prepared in the same manner as in Example 23 except that the diester compound C was used in place of the diester compound A, and the measurement of the oxygen absorption amount and the organoleptic evaluation of the odors before and after the oxygen absorption of the single layer film were performed. The results thus obtained are shown in Table 4.

Example 26

A single layer film was prepared in the same manner as in Example 23 except that the mixing amount of cobalt stearate was altered to be 250 ppm, and the measurement of the oxygen absorption amount and the organoleptic evaluation of the odors before and after the oxygen absorption of the single layer film were performed. The results thus obtained are shown in Table 4.

Example 27

A single layer film was prepared in the same manner as in Example 23 except that the mixing amount of the diester compound A was altered to 5 parts by mass, and the measurement of the oxygen absorption amount and the organoleptic evaluation of the odors before and after the oxygen absorption of the single layer film were performed. The results thus obtained are shown in Table 4.

Example 28

A single layer film was prepared in the same manner as in Example 23 except that ethylene-vinyl alcohol copolymer (trade name: "Eval F104B," manufactured by Kuraray Co., Ltd., hereinafter denoted as EVOH) in place of polyethylene terephthalate, and the melt kneading temperature was altered to 200° C., and the measurement of the oxygen absorption amount and the organoleptic evaluation of the odors before and after the oxygen absorption of the single layer film were performed. The results thus obtained are shown in Table 4.

Example 29

A single layer film was prepared in the same manner as in Example 28 except that the diester compound B was used in place of the diester compound A, and the measurement of the oxygen absorption amount and the organoleptic evaluation of the odors before and after the oxygen absorption of the single layer film were performed. The results thus obtained are shown in Table 4.

Example 30

A single layer film was prepared in the same manner as in Example 28 except that the diester compound C was used in place of the diester compound A, and the measurement of the oxygen absorption amount and the organoleptic evaluation of the odors before and after the oxygen absorption of the single layer film were performed. The results thus obtained are shown in Table 4.

Example 31

A single layer film was prepared in the same manner as in Example 23 except that polyvinyl chloride (trade name: "Kane vinyl S1001," manufactured by Kaneka Corp., hereinafter denoted as PVC) in place of polyethylene terephthalate, the mixing amount of the diester compound A was altered to 50 parts by mass, and the melt kneading temperature was altered to 150° C., and the measurement of the oxygen absorption amount and the organoleptic evaluation of the odors before and after the oxygen absorption of the single layer film were performed. The results thus obtained are shown in Table 4.

Example 32

A film was prepared in the same manner as in Example 31 except that the diester compound B was used in place of the diester compound A, and the measurement of the oxygen absorption amount and the organoleptic evaluation of the odors before and after the oxygen absorption of the single layer film were performed. The results thus obtained are shown in Table 4.

Example 33

A film was prepared in the same manner as in Example 31 except that the diester compound C was used in place of the diester compound A, and the measurement of the oxygen absorption amount and the organoleptic evaluation of the odors before and after the oxygen absorption of the single layer film were performed. The results thus obtained are shown in Table 4.

Example 34

A single layer film was prepared in the same manner as in Example 23 except that a linear low density polyethylene (trade name: "Umerit 140HK," manufactured by Ube-Maruzen Polyethylene Co., Ltd., hereinafter denoted as LLDPE) was used in place of polyethylene terephthalate, and the melt kneading temperature was altered to 200° C., and the measurement of the oxygen absorption amount and the organoleptic evaluation of the odors before and after the oxygen absorption of the single layer film were performed. The results thus obtained are shown in Table 4.

Example 35

A single layer film was prepared in the same manner as in Example 34 except that the diester compound B was used in place of the diester compound A, and the measurement of the oxygen absorption amount and the organoleptic evaluation of the odors before and after the oxygen absorption of the single layer film were performed. The results thus obtained are shown in Table 4.

Example 36

A single layer film was prepared in the same manner as in Example 28 except that polyamide 6 (trade name: "UBE Nylon 1024B," manufactured by Ube Industries, Ltd., hereinafter denoted as A6) was used in place of polyethylene terephthalate, and the diamide compound D was used in place of the diester compound A, and the measurement of the oxygen absorption amount and the organoleptic evaluation of the odors before and after the oxygen absorption of the single layer film were performed. The results thus obtained are shown in Table 4.

Example 37

A single layer film was prepared in the same manner as in Example 36 except that the diamide compound E was used in place of the diamide compound D, and the measurement of the oxygen absorption amount and the organoleptic evaluation of the odors before and after the oxygen absorption of the single layer film were performed. The results thus obtained are shown in Table 4.

Example 38

A single layer film was prepared in the same manner as in Example 36 except that the diamide compound F was used in place of the diamide compound D, and the measurement of the oxygen absorption amount and the organoleptic evaluation of the odors before and after the oxygen absorption of the single layer film were performed. The results thus obtained are shown in Table 4.

TABLE 4

| | Thermoplastic resin | Compound having tetralin ring | | Transition metal catalyst | | Oxygen absorption amount (cc/g) | | Odor |
| --- | --- | --- | --- | --- | --- | --- | --- | --- |
| | | Type | Addition amount[1] (parts by mass) | Type | Content in terms of metal[2] (ppm) | Humidity 100% | Humidity 30% | |
| Example 23 | PET | Diester compound A | 10 | Co stearate | 500 | 8 | 8 | ◉ |
| Example 24 | PET | Diester compound B | 10 | Co stearate | 500 | 7 | 7 | ◉ |

TABLE 4-continued

|  | Thermoplastic resin | Compound having tetralin ring | | Transition metal catalyst | | Oxygen absorption amount (cc/g) | | Odor |
|---|---|---|---|---|---|---|---|---|
|  |  | Type | Addition amount[1] (parts by mass) | Type | Content in terms of metal[2] (ppm) | Humidity 100% | Humidity 30% |  |
| Example 25 | PET | Diester compound C | 10 | Co stearate | 500 | 5 | 3 | ⊚ |
| Example 26 | PET | Diester compound A | 10 | Co stearate | 250 | 6 | 5 | ⊚ |
| Example 27 | PET | Diester compound A | 5 | Co stearate | 500 | 3 | 4 | ⊚ |
| Example 28 | EVOH | Diester compound A | 10 | Co stearate | 500 | 4 | 3 | ⊚ |
| Example 29 | EVOH | Diester compound B | 10 | Co stearate | 500 | 3 | 3 | ⊚ |
| Example 30 | EVOH | Diester compound C | 10 | Co stearate | 500 | 2 | 2 | ⊚ |
| Example 31 | PVC | Diester compound A | 50 | Co stearate | 500 | 17 | 10 | ⊚ |
| Example 32 | PVC | Diester compound B | 50 | Co stearate | 500 | 14 | 9 | ⊚ |
| Example 33 | PVC | Diester compound C | 50 | Co stearate | 500 | 10 | 7 | ⊚ |
| Example 34 | LLDPE | Diester compound A | 10 | Co stearate | 500 | 5 | 8 | ⊚ |
| Example 35 | LLDPE | Diester compound B | 10 | Co stearate | 500 | 6 | 9 | ⊚ |
| Example 36 | PA6 | Diamide compound D | 10 | Co stearate | 500 | 7 | 3 | ⊚ |
| Example 37 | PA6 | Diamide compound E | 10 | Co stearate | 500 | 5 | 3 | ⊚ |
| Example 38 | PA6 | Diamide compound F | 10 | Co stearate | 500 | 4 | 2 | ⊚ |

[1]Parts by mass based on 100 parts by mass of the thermoplastic resin.
[2]Addition amount based on (the thermoplastic resin + the compound having tetralin ring).

As can be seen from Examples 23 to 38, the oxygen absorbent compositions of the present invention exhibited the oxygen absorption performance both at a high humidity and at a low humidity.

As described above, the present invention is not limited to the foregoing embodiment and Examples, and modifications can be appropriately added to the present invention within the range not deviating from the gist of the present invention.

It is to be noted that the present application claims the priority based on Japanese Patent Application No. 2011-190695 filed Sep. 1, 2011 at the Japan Patent Office and Japanese Patent Application No. 2012-165374 filed Jul. 26, 2012 at the Japanese Patent Office, the contents of which are incorporated herein by reference.

INDUSTRIAL APPLICABILITY

The oxygen absorbent composition and the like of the present invention have excellent oxygen absorption performance, and can be used widely and effectively in the technical fields in general, requiring the absorption of oxygen. The oxygen absorbent composition and the like of the present invention can absorb oxygen regardless of the presence or absence of the moisture of the object to be stored, and in addition, suppress the increase of the odor intensity after the absorption of oxygen; thus, the oxygen absorbent composition and the like of the present invention can be utilized particularly effectively for, for example, food, prepared food, beverages, pharmaceuticals and health food. In addition, an oxygen absorbent not responding to metal detectors can also be realized, and hence can be widely and effectively used in the applications to detect from the outside metals, metal pieces and the like with metal detectors, such as the applications involving packaging, vessels or the like.

The invention claimed is:

1. An oxygen absorbent composition comprising at least one compound having a tetralin ring represented by the following formula (1) and a transition metal catalyst:

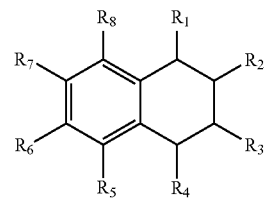

(1)

wherein, in formula (1), $R_1$ to $R_8$ each independently represent a hydrogen atom or a monovalent substituent; the monovalent substituent is selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group; and these groups may further have a substituent(s).

2. The oxygen absorbent composition according to claim 1, wherein in the formula (1), two or more of $R_1$ to $R_8$ represent the acyl group.

3. The oxygen absorbent composition according to claim 2, wherein in the formula (1), two or more of $R_1$ to $R_8$ are each a monovalent substituent represented by the following formula (2):

$$-C(=O)X \qquad (2)$$

wherein, in formula (2), X is a hydrogen atom, a hydroxy group, an alkyl group, an alkoxy group, a monoalkylamino group or a dialkylamino group.

4. The oxygen absorbent composition according to claim 3, wherein in the formula (1), $R_1$ to $R_8$ satisfy any of the following requirements (A) to (C);

(A) one or more of $R_1$ to $R_4$ are the monovalent substituents represented by the formula (2), and one or more of $R_5$ to $R_8$ are the monovalent substituents represented by the formula (2);

(B) two or more of $R_1$ to $R_4$ are the monovalent substituents represented by the formula (2); and (C) two or more of $R_5$ to $R_8$ are the monovalent substituents represented by the formula (2).

5. The oxygen absorbent composition according to claim 1, wherein the compound having the tetralin ring represented by the formula (1) has a molecular weight of 190 to 1500.

6. The oxygen absorbent composition according to claim 1, further comprising a carrier substance.

7. The oxygen absorbent composition according to claim 6, wherein the carrier substance is at least one or more selected from the group consisting of synthetic calcium silicate, diatom earth, silica and activated carbon.

8. The oxygen absorbent composition according to claim 6, wherein the carrier substance is contained in an amount of 10 to 1000 parts by mass based on 100 parts by mass of the compound having the tetralin ring represented by the formula (1).

9. The oxygen absorbent composition according to claim 1, wherein the transition metal catalyst comprises at least one or more transition metals selected from the group consisting of manganese, iron, cobalt, nickel and copper.

10. The oxygen absorbent composition according to claim 1, wherein the transition metal catalyst is contained in an amount of 0.001 to 10 parts by mass in terms of the transition metal amount, based on 100 parts by mass of the compound having the tetralin ring represented by the formula (1).

11. The oxygen absorbent composition according to claim 1, further comprising a thermoplastic resin.

12. The oxygen absorbent composition according to claim 11, further comprising a carrier substance.

13. The oxygen absorbent composition according to claim 12, wherein the carrier substance is at least one or more selected from the group consisting of synthetic calcium silicate, diatom earth, silica and activated carbon.

14. The oxygen absorbent composition according to claim 12, wherein the carrier substance is contained in an amount of 10 to 1000 parts by mass based on 100 parts by mass of the compound having the tetralin ring represented by the formula (1).

15. The oxygen absorbent composition according to claim 11, wherein the transition metal catalyst comprises at least one or more transition metals selected from the group consisting of manganese, iron, cobalt, nickel and copper.

16. The oxygen absorbent composition according to claim 11, wherein the transition metal catalyst is contained in an amount of 0.001 to 10 parts by mass in terms of the transition metal amount, based on 100 parts by mass of the compound having the tetralin ring represented by the formula (1).

17. An oxygen absorbent package formed by packaging the oxygen absorbent composition according to claim 1 with an air permeable packaging material.

* * * * *